(12) United States Patent
Fujii

(10) Patent No.: US 10,870,446 B2
(45) Date of Patent: Dec. 22, 2020

(54) STEERING ASSIST DEVICE

(71) Applicant: TOYOTA JIDOSHA KABUSHIKI KAISHA, Toyota (JP)

(72) Inventor: Shota Fujii, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 15/996,700

(22) Filed: Jun. 4, 2018

(65) Prior Publication Data

US 2018/0346019 A1 Dec. 6, 2018

(30) Foreign Application Priority Data

Jun. 6, 2017 (JP) ................................ 2017-111687

(51) Int. Cl.
*B62D 6/00* (2006.01)
*B62D 15/02* (2006.01)
*B62D 1/28* (2006.01)

(52) U.S. Cl.
CPC ............. *B62D 6/003* (2013.01); *B62D 1/286* (2013.01); *B62D 6/001* (2013.01); *B62D 15/0255* (2013.01); *B60Y 2300/18166* (2013.01)

(58) Field of Classification Search
CPC .......... B62D 6/003; B62D 6/001; B62D 6/00; B62D 1/286; B62D 15/0255; B62D 137/00; B62D 113/00; B62D 109/00; B62D 101/00; B62D 6/002; B60Y 2300/18166; B60W 50/14; B60W 50/08; B60W 50/029; B60W 10/04; B60W 10/20; B60W 30/08; B60W 30/12; B60W 30/16; B60W 30/095; B60W 40/02; B60W 2520/00; B60W 2520/06; B60W 2550/00; B60W 2550/10; B60W 2550/14; B60W 2550/146; B60W 2550/20; G08G 1/16; G08G 1/167; G08G 1/00; G08G 1/0104; G08G 1/0125; G08G 1/161; G08G 1/162; G08G 1/163; G08G 1/166; B60T 8/17; B60T 7/12; G05G 1/16; F02D 29/02; B60R 21/00; B60K 31/00;
(Continued)

(56) References Cited

U.S. PATENT DOCUMENTS 8,577,515 B2 * 11/2013 Kobayashi .......... B60T 8/17558
701/1
2005/0270145 A1 12/2005 Kataoka et al.
(Continued)

FOREIGN PATENT DOCUMENTS

JP 2006-315491 A 11/2006
JP 2008-195402 A 8/2008
(Continued)

*Primary Examiner* — Anthony R Jimenez
(74) *Attorney, Agent, or Firm* — Sughrue Mion, PLLC

(57) ABSTRACT

A steering control device includes a driving support ECU. When white line recognition loss, which is a state in which white lines are not properly recognizable, has occurred during execution of an LCA, the driving support ECU calculates a target trajectory for returning a yaw angle to a state immediately before the start of the LCA. The driving support ECU controls a steering angle based on the calculated target trajectory. As a result, a lateral speed of an own vehicle is reduced, and thus sufficient time can be secured for handing over operation of a steering wheel to a driver from a steering assist state.

6 Claims, 12 Drawing Sheets

FIG.12

(58) Field of Classification Search
CPC .......... G06T 2207/30252; G06T 2207/30256; G01C 21/00; G01C 21/26; G01C 21/28
USPC ........................................... 701/41; 348/148
See application file for complete search history.

(56) References Cited

U.S. PATENT DOCUMENTS

| | | |
|---|---|---|
| 2006/0025918 A1 | 2/2006 | Saeki |
| 2016/0003636 A1* | 1/2016 | Ng-Thow-Hing ..... H04N 7/188 701/26 |
| 2016/0114811 A1 | 4/2016 | Matsuno et al. |

FOREIGN PATENT DOCUMENTS

| | | |
|---|---|---|
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 4929777 B2 | 5/2012 |
| JP | 2014-133477 A | 7/2014 |
| JP | 2014-148293 A | 8/2014 |
| JP | 2015-178332 A | 10/2015 |
| JP | 2015-223933 A | 12/2015 |
| JP | 2016-084038 A | 5/2016 |

* cited by examiner

STEERING ASSIST DEVICE

BACKGROUND OF THE INVENTION

1. Field of the Invention

The present invention relates to a steering assist device configured to assist a steering operation for changing lanes.

2. Description of the Related Art

Hitherto, there has been known a steering assist device configured to execute control (referred to as a "lane change assist control") to assist a steering operation so that an own vehicle changes lanes from an original lane in which the own vehicle is currently traveling to an adjacent lane. The steering assist device recognizes the lanes by using a camera sensor, for example, and causes the own vehicle to change lanes from the original lane to the adjacent lane under a state in which the position of the own vehicle relative to the lanes is grasped.

For example, in Japanese Patent Application Laid-open No. 2016-84038, there is proposed a control device configured to automatically perform a lane change in order to overtake a preceding vehicle (vehicle to be overtaken) traveling ahead of an own vehicle.

When an abnormality in travel environment information is detected after the overtaking control has started, the control device performs control for reducing the speed of the own vehicle by brake control such that the own vehicle is at a position behind the vehicle to be overtaken, and then returning the own vehicle to the original lane based on travel information and travel environment information immediately before the abnormality in travel environment information is detected.

For example, during the lane change assist control, white lines formed on the road may become undetectable by the camera sensor, resulting in a failure to recognize a lane. In such a case, when control for returning the own vehicle to the original lane is executed, like by the device proposed in Japanese Patent Application Laid-open No. 2016-84038, the own vehicle may collide with another vehicle (a vehicle different from the vehicle to be overtaken). Further, when the speed of the own vehicle is reduced by brake control, secondary damage, for example, a collision with another vehicle traveling behind the own vehicle, may also occur. In addition, the driver may feel a sense of unease when the speed of the own vehicle is reduced each time a lane is no longer recognizable.

However, when the lane change assist control is simply ended, a state in which a lateral speed is being generated for the own vehicle may continue, and thus the driver may be slow to operate the steering wheel, causing the own vehicle to depart from the lane.

SUMMARY OF THE INVENTION

The present invention has been made in order to solve the above-mentioned problems, and has an object to secure sufficient time for handing over operation of a steering wheel to a driver and reduce a possibility of an own vehicle departing from a lane when the lane is not properly recognizable during a lane change assist control.

In order to achieve the above-mentioned object, according to one embodiment of the present invention, there is provided a steering assist device including:

lane recognition means (12) for recognizing a lane to acquire lane information including a relative positional relation of an own vehicle with respect to the lane;

lane change assist control means (10, 20) for executing a lane change assist control, in which a steering is controlled based on the lane information so that the own vehicle changes lanes from an original lane in which the own vehicle is currently traveling to a target lane adjacent to the original lane;

recognition failure state detection means (S15) for detecting a recognition failure state, which is a state in which the lane is not properly recognizable by the lane recognition means;

lane change assist stop means (S19, S22) for stopping the lane change assist control when the recognition failure state is detected during execution of the lane change assist control; and yaw angle return control means (S19 to S21) for executing a yaw angle return control, in which, when the lane change assist control has been stopped due to detection of the recognition failure state, the steering is controlled so that a yaw angle, which is an angle formed between a formation direction of the lane and a direction in which the own vehicle faces, is reduced by an amount of increase resulting from the lane change assist control.

According to the one embodiment of the present invention, the lane recognition means recognizes the lane and acquires the lane information including the relative positional relation of the own vehicle with respect to the lane. The lane is, for example, a region sectioned by white lines. Therefore. "recognizing a lane" means "recognizing the white lines". Recognition of the lane enables a relative positional relation of the own vehicle with respect to the lane to be acquired.

The lane change assist control means executes the lane change assist control, in which the steering is controlled based on the lane information so that the own vehicle changes from the original lane in which the own vehicle is currently traveling to the target lane adjacent to the original lane. As a result, the own vehicle changes lanes to the target lane without requiring the driver to operate the steering wheel.

During lane change assist control, the lane may not be properly recognized. To deal with such a problem, the steering assist device includes the recognition failure state detection means, the lane change assist stop means, and the yaw angle return control means. The recognition failure state detection means detects the recognition failure state, which is the state in which the lane is not property recognizable by the lane recognition means. The recognition failure state detection means may, for example, detect a state in which the lane is not recognizable by at least the lane recognition means, or for example, detect a state in which the lane is not recognizable by the lane recognition means, and detect a state in which the lane is recognizable, but the reliability of the recognition state is lower than a standard. In the recognition failure state, the lane change assist control is not executed property. Therefore, the lane change assist stop means stops the lane change assist control when the recognition failure state is detected during execution of the lane change assist control.

The yaw angle return control means executes the yaw angle return control, in which, when the lane change assist control has been stopped due to the detection of the recognition failure state, the steering is controlled so that the yaw angle, which is the angle formed between the formation direction of the lane and the direction in which the own vehicle faces, is reduced by the amount of increase resulting from the lane change assist control. Therefore, even when the lane is not property recognizable, the direction of the own vehicle can be brought closer to the formation direction of the lane. As a result, a lateral speed, which is the speed of the own vehicle in the lane width direction, can be reduced as much as possible.

In this case, the lateral speed of the own vehicle is reduced by the yaw angle return control, and thus sufficient time can be secured for handing over operation of the steering wheel to the driver after lane change assist control is stopped. More specifically, the driver can be caused to start operating the steering wheel before the own vehicle departs from the lane. As a result, the possibility of the own vehicle departing from the lane can be reduced.

A feature of one embodiment of the present invention resides in that the steering assist device further includes notification means (S19, S22) for notifying, when the recognition failure state is detected, a driver that operation of a steering wheel is required.

According to the one embodiment of the present invention, when the recognition failure state is detected, the notification means notifies the driver that the operation of the steering wheel is required. As a result, the possibility of the own vehicle departing from the lane can be further reduced.

A feature of one embodiment of the present invention resides in that:

the steering assist device further includes lane trace assist control means (S11) for executing a lane trace assist control, in which the steering is controlled based on the lane information so that a travel position of the own vehicle is kept at a fixed position in a lane width direction in the lane;

the lane change assist control means is configured to stop the lane trace assist control and start the lane change assist control (S12, S13) when a lane change assist request is received under a state in which the lane trace assist control is being executed; and the yaw angle return control means is configured to control the steering so that the yaw angle that has increased as a result of the lane change assist control is returned to the yaw angle immediately before a time point at which the lane change assist control starts.

The steering assist device according to the one embodiment of the present invention further includes the lane trace assist control means. The lane trace assist control means executes the lane trace assist control, in which the steering is controlled based on the lane information so that the travel position of the own vehicle is kept at the fixed position in the lane width direction in the lane. According to one or more embodiments of the present invention, the fixed position is, for example, a center position in the lane width direction. When the lane change assist control means receives the lane change assist request under the state in which the lane trace assist control is being executed, the lane change assist control means stops the lane trace assist control and starts the lane change assist control. As a result, when the lane change assist control is started, the yaw angle is estimated to be a value close to zero.

When the lane change assist control is started, in order to cause the own vehicle to travel toward the target lane, the yaw angle increases. The yaw angle return control means controls the steering so that the yaw angle that has increased as a result of the lane change assist control is returned to the yaw angle immediately before the lane change assist control started. As a result, even under a state in which the lane is not properly recognizable, the direction of the own vehicle can be appropriately brought closer to the formation direction of the lane, and the lateral speed of the own vehicle can be reduced as much as possible.

A feature of one embodiment of the present invention resides in that:

the lane change assist control means is configured to calculate at a predetermined calculation cycle a target control amount including a feed-forward control amount ($K_{lca}1 \cdot Cu^*$) that uses a target curvature ($Cu^*$) of a trajectory for changing the lane of the own vehicle, and to control the steering based on the calculated target control amount; and the yaw angle return control means is configured to calculate an integral value of the target curvature from the start of the lane change assist control to the detection of the recognition failure state, to calculate a target control amount based on the calculated integral value, and to control the steering based on the calculated target control amount.

According to the one embodiment of the present invention, the lane change assist control means calculates at the predetermined calculation cycle the target control amount including the feed-forward control amount that uses the target curvature of the trajectory for changing the lane of the own vehicle, and controls the steering based on the calculated target control amount. A change in the target curvature corresponds to a change in the steering angle, and can be grasped as a change in the yaw angle. This means that the yaw angle can be brought close to the value immediately before the lane change assist control is started by controlling the steering so that an integral value of the target curvature from the start of the lane change assist control is set to zero. When the lane is not recognizable, it is impossible to execute a steering control by using lane information.

Therefore, the yaw angle return control means calculates an integral value of the target curvature in a period from the time point at which the lane change assist control starts to the detection of the recognition failure state, calculates a target control amount based on the calculated value corresponding to an integral value, and controls the steering based on the calculated target control amount. The target control amount can be calculated by, for example, using a value in which the sign of the integral value of the target curvature has been reversed. The integral value of the target curvature can be determined by integrating the target curvature. However, the integral value of the target curvature can also be determined by, for example, calculating a value obtained by dividing the lateral speed of the own vehicle when the white line recognition loss is detected (the target lateral speed in terms of control in one or more embodiments of the present invention) by the square of the vehicle speed.

The yaw angle immediately before the lane change assist control is started is a value close to zero. Therefore, even when the lane is not property recognizable, the direction of the own vehicle can be brought closer to the formation direction of the lane in an appropriate manner by the feed-forward control. As a result, the lateral speed, which is the speed of the own vehicle in the lane width direction, can be reduced.

A feature of one embodiment of the present invention resides in that:

the steering assist device further includes:

lane trace assist control means (10, 20) for executing the lane trace assist control, in which the steering is controlled based on the lane information so that a travel position of the own vehicle is kept at a fixed position in a lane width direction in the lane; and lane keep assist stop means (10) for stopping the lane trace assist control when the recognition failure state is detected during execution of the lane trace assist control; and the notification means is configured to notify, by using screens (31c) having the same display content, the driver that the operation of the steering wheel is required when the lane trace assist control is stopped by the lane keep assist stop means and when the lane change assist control is stopped by the lane change assist stop means.

According to the one embodiment of the present invention, the steering assist device further includes the lane trace assist control means and the lane keep assist stop means. The lane trace assist control means executes lane trace assist control, in which the steering is controlled based on the lane information so that the travel position of the own vehicle is kept at the fixed position in the lane width direction in the lane. This lane trace assist control is executed when the lane change assist request has not been received. The lane keep assist stop means stops the lane trace assist control when the recognition failure state is detected during the execution of the lane trace assist control.

In the present invention, the yaw angle return control is executed when the lane change assist control has been stopped by the lane change assist stop means. On the other hand, the yaw angle return control is not required when the recognition failure state is detected during execution of the lane trace assist control, and hence is not executed. As a result, the control state after the recognition failure state is detected is different when the recognition failure state is detected during execution of the lane trace assist control from when the recognition failure state is detected during execution of the lane change assist control. In this case, in a case where different display screens for notifying the steering assist state are displayed when the recognition failure state is detected during execution of the lane trace assist control and when the recognition failure state is detected during execution of the lane change assist control, the driver may not be able to start operating the steering wheel in a smooth manner due to the differences in each of those display screens. Specifically, providing the driver with more information than is required may lengthen the time required to hand over operation of the steering wheel to the driver from the steering assist state.

In consideration of this, according to the one embodiment of the present invention, the notification means notifies, by using the screens having the same display content, the driver that the operation of the steering wheel is required when the lane trace assist control is stopped by the lane keep assist stop means and when the lane change assist control is stopped by the lane change assist stop means. As a result, more information than is required is not provided to the driver (for example, information that yaw angle return control is being executed is not provided), and thus the driver can start to smoothly operate the steering wheel when any one of those assist controls (lane change assist control and lane trace assist control) is stopped.

A feature of one embodiment of the present invention resides in that:

the steering assist device further includes lateral speed determination means (S18) for determining, when the recognition failure state is detected, whether or not a lateral speed, which is a speed of the own vehicle in a lane width direction, is in a lane change direction and is larger than a threshold; and the yaw angle return control means is configured to execute the yaw angle return control when it is determined that the lateral speed is in the lane change direction and is larger than the threshold.

When the recognition failure state of the lane is detected, it is not required to control the yaw angle when a lateral speed of the own vehicle is not being generated in the lane change direction. Therefore, when the recognition failure state is detected, the lateral speed determination means determines whether or not the lateral speed, which is the speed of the own vehicle in the lane width direction, is in the lane change direction and is larger than the threshold. This threshold is for determining the necessity of reducing the yaw angle (absolute value of the yaw angle). According to one or more embodiments of the present invention, the threshold is a value close to zero, including zero.

The yaw angle return control means executes the yaw angle return control when it is determined that the lateral speed is in the lane change direction and is larger than the threshold. Therefore, the steering control can be prevented from being performed more than is required.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DETAILED DESCRIPTION OF THE PREFERRED EMBODIMENT

A steering assist device for a vehicle according to an embodiment of the present invention will be described below with reference the drawings.

Figure 1:
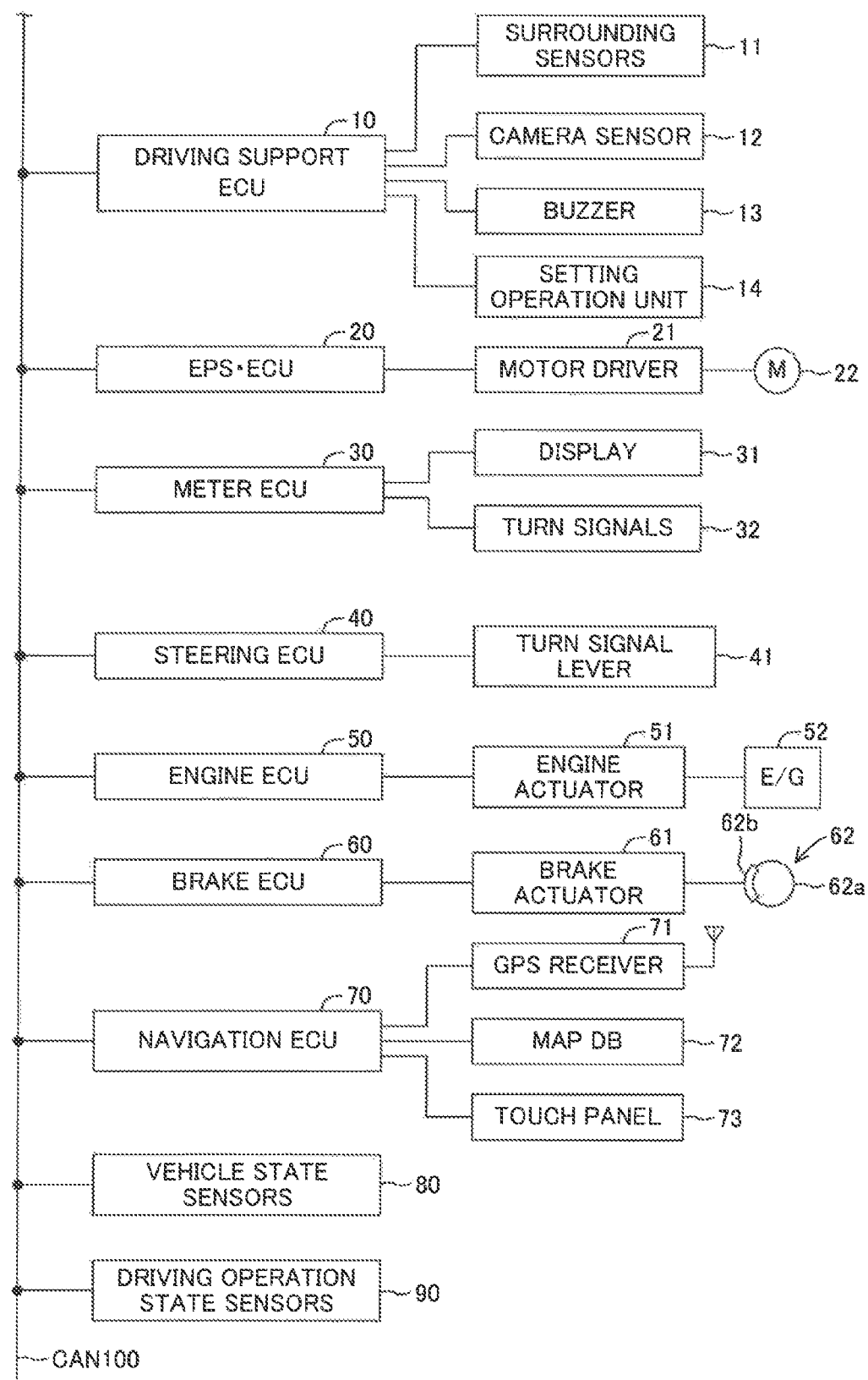
FIG. 1 is a schematic configuration diagram for illustrating a steering assist device according to an embodiment of the present invention.

The steering assist device according to the embodiment of the present invention is applied to a vehicle (hereinafter also referred to as an "own vehicle" in order to distinguish the vehicle from other vehicles), and as illustrated in FIG. 1, includes a driving support ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to implement various functions. Some or all of those ECUs may be integrated into one ECU.

A plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed of the vehicle, a longitudinal G sensor configured to detect an acceleration in a longitudinal direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of an operation on the brake pedal, a steering angle sensor configured to detect a steering angle, a steering torque sensor configured to detect a steering torque, and a shift position sensor configured to detect a shift position of a transmission.

Information (called "sensor information") detected by the vehicle state sensors 80 and the driving operation state sensors 90 is transmitted to the CAN 100. Each of the ECUs can utilize the sensor information transmitted to the CAN 100 as appropriate. The sensor information is information from a sensor connected to a specific ECU among the ECUs, and may be transmitted from that specific ECU to the CAN 100. For example, the accelerator operation amount sensor may be connected to the engine ECU 50. In this case, the sensor information indicative of the accelerator operation amount is transmitted from the engine ECU 50 to the CAN 100. For example, the steering angle sensor may be connected to the steering ECU 40. In this case, the sensor information indicative of the steering angle is transmitted from the steering ECU 40 to the CAN 100. The same applies to the other sensors. Further, there may be employed a configuration in which, without interposition of the CAN 100, the sensor information may be transmitted and received through direct communication between specific ECUs among the ECUs.

Figure 2:
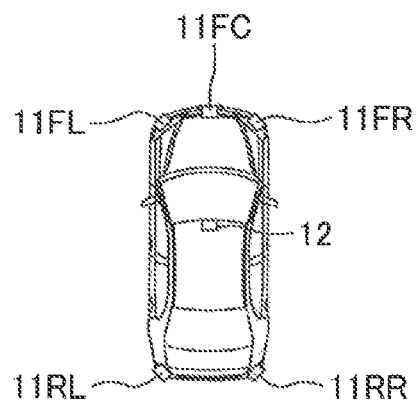
FIG. 2 is a plan view for illustrating mounting positions of surrounding sensors and a camera sensor.

The driving support ECU 10 is a control device serving as a main device for performing driving support for a driver, and performs a lane change assist control, a lane trace assist control, and an adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions from each other. In the following, the surrounding sensors 11FC, 11FR, 11FL, 11RR, and 11RL are called "surrounding sensors 11" when the sensors are not required to be individually distinguished from one another.

Each of the surrounding sensors 11 includes a radar transceiver and a signal processor (not shown). The radar transceiver radiates a radio wave in a millimeter waveband (hereinafter referred to as a "millimeter wave"), and receives the millimeter wave (that is, a "reflected wave") reflected by a three-dimensional object (for example, an other vehicle, an pedestrian, a bicycle, and a building) present within a radiation range. The signal processor acquires, every time a predetermined time period elapses, information (hereinafter called "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. The surrounding information can be used to detect a longitudinal direction component and a lateral direction component in the distance between the own vehicle and the three-dimensional object and a longitudinal direction component and a lateral direction component in the relative speed between the own vehicle and the three-dimensional object.

As illustrated in FIG. 2, the front-center surrounding sensor 11FC is provided at a front-center portion of a vehicle body, and detects a three-dimensional object present in a front region of the own vehicle. The front-right surrounding sensor 11FR is provided at a front-right corner portion of the vehicle body, and mainly detects a three-dimensional object present in a front-right region of the own vehicle. The front-left surrounding sensor 11FL is provided at a front-left corner portion of the vehicle body, and mainly detects a three-dimensional object present in a front-left region of the own vehicle. The rear-right surrounding sensor 11RR is provided at a rear-right corner portion of the vehicle body, and mainly detects a three-dimensional object present in a rear-right region of the own vehicle. The rear-left surrounding sensor 11RL is provided at a rear-left corner portion of the vehicle body, and mainly detects a three-dimensional object present in a rear-left region of the own vehicle.

In this embodiment, the surrounding sensors 11 are radar sensors, but other sensors such as clearance sonars and light detection and ranging (LIDAR) sensors can be employed instead.

Further, a camera sensor 12 is connected to the driving support ECU 10. The camera sensor 12 includes a camera unit and a lane recognition unit configured to analyze image data obtained based on an image taken by the camera unit to recognize a white line of a road. The camera sensor 12 (camera unit) photographs a landscape in front of the own vehicle. The camera sensor 12 (lane recognition unit) repeatedly supplies information relating to the recognized white line to the driving support ECU 10 every time a predetermined calculation period elapses.

The camera sensor 12 is capable of recognizing a lane representing a region sectioned by white lines and is capable of detecting a relative positional relationship of the own vehicle with respect to the lane (relationship in position between the own vehicle and the lane) based on a positional relationship between the white lines and the own vehicle. The position of the own vehicle corresponds to (or is represented by) the center of gravity of the own vehicle. As will be described later, a lateral position of the own vehicle represents the position of the center of gravity of the own vehicle in the lane width direction, a lateral speed of the own vehicle represents the speed of the center of gravity of the own vehicle in the lane width direction, and a lateral acceleration of the own vehicle represents the acceleration of the center of gravity of the own vehicle in the lane width direction. The lateral position, the lateral speed, and the lateral acceleration are obtained based on the relative positional relationship between the white lines and the own vehicle detected by the camera sensor 12. The position of the own vehicle is represented by the center of gravity of the own vehicle in the present embodiment, however, the position of the own vehicle can be represented by a specific position set in advance (for example, the center position of the own vehicle in a planar view).

Figure 3:
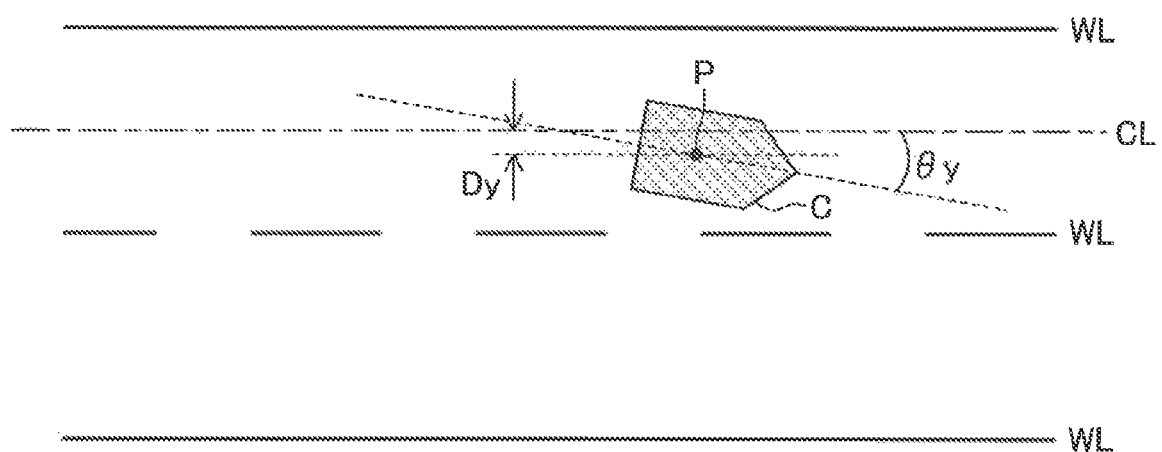
FIG. 3 is a diagram for illustrating lane-related vehicle information.

As illustrated in FIG. 3, the camera sensor 12 determines a lane center line CL corresponding to a center position in a width direction of right and left white lines WL defining a lane in which the own vehicle is traveling. The lane center line CL is used as a target travel line in the lane trace assist control described later. Further, the camera sensor 12 calculates a curvature Cu of a curve of the lane center line CL.

The camera sensor 12 also calculates the position and the (traveling) direction of the own vehicle in the lane sectioned by the right and left white lines WL. For example, as illustrated in FIG. 3, the camera sensor 12 calculates a distance Dy (m) in a lane width direction between a center of gravity point P of the own vehicle C and the lane center line CL, namely, the distance Dy by which the own vehicle C is shifted/deviated from the lane center line CL in the lane width direction. This distance Dy is referred to as a "lateral deviation Dy". The camera sensor 12 also calculates an angle formed between the direction of the lane center line CL and the direction in which the own vehicle C faces (travels), namely, an angle θy (rad) by which the direction in which the own vehicle C faces is deviated from the direction of the lane center line CL in a horizontal plane. This angle θy is referred to as a "yaw angle θy". When the lane is curved, the lane center line CL is also curved, and thus the yaw angle θy represents (becomes equal to) the angle by which the direction in which the own vehicle C faces is deviated from the curved lane center line CL. In the following, information (Cu, Dy, and θy) representing the curvature Cu, the lateral deviation Dy, and the yaw angle θy is referred to as "lane-related vehicle information". The right and left directions of the lateral deviation Dy and the yaw angle θy with respect to the lane center line CL are identified by a sign (plus or minus) of values of those. Regarding the curvature Cu, the direction of the curve (right or left) is identified by a sign (plus or minus) of a value of the curvature Cu.

Further, the camera sensor 12 also supplies, to the driving support ECU 10, information on not only the lane of the own vehicle in which the own vehicle is traveling but also on lanes adjacent to the lane of the own vehicle ever time a predetermined calculation period elapses. When the white line is a solid line, the vehicle is inhibited from crossing the white line to change lanes. In contrast, when the white line is a broken line (white line intermittently formed at certain intervals), the vehicle is allowed to cross the white line to change lanes. The lane-related vehicle information (Cu, Dy, and θy) and the information relating to the white line(s) are collectively referred to as "lane information".

In this embodiment, the camera sensor 12 calculates the lane-related vehicle information (Cu, Dy, and θy). However, in place of the camera sensor 12, the driving support ECU 10 may acquire the lane information through analyzing the image data output from the camera sensor 12.

Further, the camera sensor 12 can also detect a three-dimensional object present in front of (ahead of) the own vehicle based on the image data. Therefore, the camera sensor 12 may obtain not only the lane information but also front surrounding information through calculation. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy. The surrounding information generated by the synthesis processor may be supplied to the driving support ECU 10 as the front surrounding information on the own vehicle.

As illustrated in FIG. 1, a buzzer 13 is connected to the driving support ECU 10. The buzzer 13 generates a sound when receiving a buzzer sounding signal from the driving support ECU 10. The driving support ECU 10 sounds the buzzer 13 when, for example, the driving support ECU 10 notifies the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be sounded by the notification ECU. In this case, the driving support ECU 10 transmits a buzzer sounding command to the notification ECU.

Further, instead of or in addition to the buzzer 13, a vibrator for generating vibration for notification to the driver may be provided. For example, the vibrator is provided in a steering wheel to vibrate the steering wheel, to thereby alert the driver.

The driving support ECU 10 performs the lane change assist control, the lane trace assist control, and the adaptive cruise control, based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to perform each of the lane change assist control, the lane trace assist control, and the adaptive cruise control. The driving support ECU 10 receives a setting signal as input from the setting operation unit 14 to determine whether or not to perform each control. In this case, when the execution of the adaptive cruise control is not selected, the lane change assist control and the lane trace assist control are automatically set to be unexecuted. Further, when the execution of the lane trace assist control is not selected, the lane change assist control is automatically set to be unexecuted.

Further, the setting operation unit 14 has a function of inputting parameters or the like representing preference of the driver when the above-mentioned control is performed.

The electric power steering ECU 20 is a control device for an electric power steering device. In the following, the electric power steering ECU 20 is called an "EPS ECU 20".

The EPS ECU 20 is connected to a motor driver 21. The EPS ECU 20 is connected to a motor driver 21. The motor driver 21 is connected to a steering motor 22. The steering motor 22 is integrated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) using a steering torque sensor provided to the steering shaft, and controls energization of the motor driver 21 based on the steering torque to drive the steering motor 22. The assist motor is driven as described above so that the steering torque is applied to the steering mechanism, and thus a steering operation of the driver is assisted.

Further, when the EPS ECU 20 receives a steering command from the driving support ECU 10 via the CAN 100, the EPS ECU 20 drives the steering motor 22 in accordance with a control amount indicated by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

Even in a case where a steering command is received from the driving support ECU 10, when a steering torque from the steering wheel operation by the driver is detected and that steering torque is larger than a threshold, the EPS ECU 20 prioritizes the steering wheel steering performed by the driver to generate the steering assist torque that lightens the steering wheel operation.

The meter ECU 30 is connected to a display unit 31 and right and left turn signals 32 (meaning turn signal lamps and sometimes called "turn lamps"). The display unit 31 is, for example, a multi-information display provided in front of a driver's seat, and displays various types of information in addition to values measured by meters, for example, a vehicle speed. For example, when the meter ECU 30 receives a display command in accordance with the driving support state from the driving support ECU 10, the meter ECU 30 causes the display unit 31 to display a screen instructed in the display command. As the display unit 31, instead of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged in a right or left side of the own vehicle, designated by the turn signal flashing command. Further, while the meter ECU 30 intermittently flashes the turn signal 32, the meter ECU 30 transmits, to the CAN 100, turn signal flashing information representing that the turn signal 32 is in a flashing state. Therefore, other ECUs can recognize the flashing state of the turn signal 32.

The steering ECU 40 is connected to a turn signal lever 41. The turn signal lever 41 is an operation unit for actuating (intermittently flashing) the turn signal 32, and is provided to a steering column. The turn signal lever 41 is provided to be swingable at a two-stage operation stroke about a support shaft in each of a counterclockwise operation direction and a clockwise operation direction.

Figure 4:
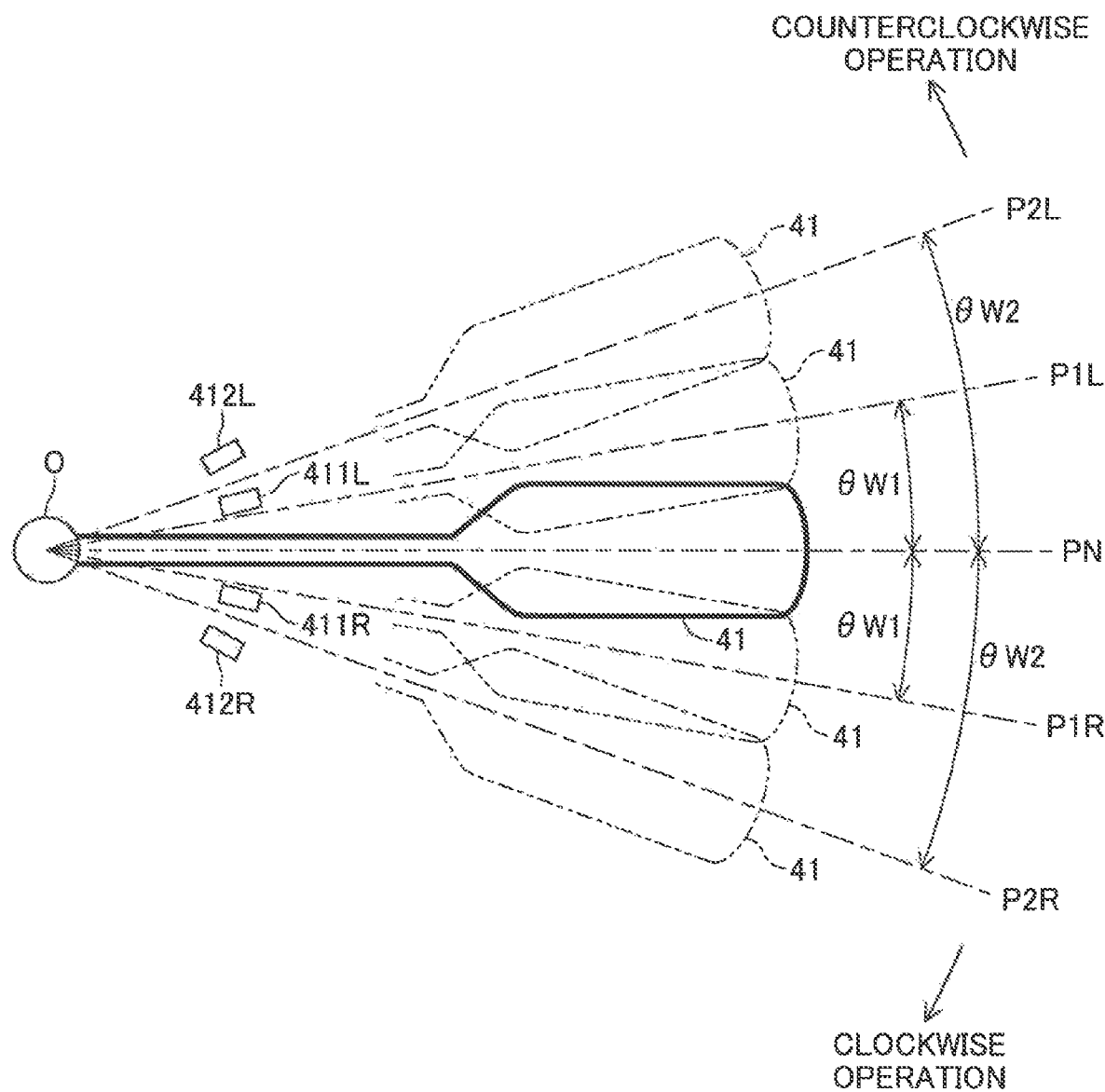
FIG. 4 is a diagram for illustrating actuation of a turn signal lever.

The turn signal lever 41 in this embodiment also acts as an operation device for requesting the lane change assist control by the driver. As illustrated in FIG. 4, the turn signal lever 41 is configured to be capable of being selectively operated between a first stroke position P1L (P1R), which is a position rotated by a first angle $\theta W1$ from a neutral position PN, and a second stroke position P2L (P2R), which is a position rotated by a second angle $\theta W2$ ($>\theta W1$) from the neutral position PN, in each of the clockwise operation direction and the counterclockwise operation direction about a support shaft O. When the turn signal lever 41 has been moved to the first stroke position P1L (P1R) by a lever operation by the driver, the turn signal lever 41 returns to the neutral position PN when a lever operation force by the driver is released/disappeared. When the turn signal lever 41 has been moved to the second stroke position P2L (P2R) by a lever operation by the driver, the turn signal lever 41 is held at the second stroke position P2L (P2R) by a lock mechanism even when the lever operation force is released/disappeared. Under a state in which the turn signal lever 41 is held at the second stroke position P2L (P2R), when the steering wheel is reversely rotated to be returned to the neutral position, or when the driver operates and returns the turn signal lever 41 to the neutral position, the locking by the lock mechanism is released, and the turn signal lever 41 is returned to the neutral position PN.

The turn signal lever 41 includes a first switch 411L (411R) that turns on (generates an ON signal) only when the turn signal lever 41 is positioned at the first stroke position P1L (P1R), and a second switch 412L (412R) that turns on (generates an ON signal) only when the turn signal lever 41 is positioned at the second stroke position P2L (P2R).

The steering ECU 40 detects the operation state of the turn signal lever 41 based on the presence/absence of the ON signal from the first switch 411L (411R) and the second switch 412L (412R). When the turn signal lever 41 is in a state tilted to the first stroke position P1L (P1R) and when the turn signal lever 41 is in a state tilted to the second stroke position P2L (P2R), the steering ECU 40 transmits, to the meter ECU 30, the turn signal flashing command including information representing the operation direction (right or left).

The steering ECU 40 outputs, when it is detected that the turn signal lever 41 has been continuously held at the first stroke position P1L (P1R) for a predetermined time (lane change request confirmation time: e.g., 1 second) or longer, to the driving support ECU 10 a lane change assist request signal including information indicating that operation direction (right or left). Therefore, when the driver wishes to receive lane change assist during driving, the driver is only required to tilt the turn signal lever 41 to the first stroke position P1L (P1R) in the lane change direction and maintain that state for the predetermined time or more. This operation is referred to as a "lane change assist request operation".

In this embodiment, the turn signal lever 41 is used as the operation device for the driver to request lane change assist (control). However, in place of the turn signal lever 41, a dedicated lane change assist request operation device may be arranged on the steering wheel, for example.

The engine ECU 50 illustrated in FIG. 1 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration).

The brake ECU 60 is connected to a brake actuator 61. The brake actuator 61 is provided in a hydraulic circuit between a master cylinder (not shown) configured to pressurize a working fluid with a stepping force on a brake pedal and friction brake mechanisms 62 provided on the front/rear left/right wheels. The friction brake mechanisms 62 include a brake disk 62a fixed to the wheel and a brake caliper 62b fixed to a vehicle body. The brake actuator 61 is configured to adjust a hydraulic pressure supplied to a wheel cylinder integrated into the brake caliper 62b in accordance with a command from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle to change a deceleration state (deceleration).

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and executes various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature, the road lane width, the number of road lanes, and the position of the lane center line of each road lane) indicative of the position and the shape of the road. Further, the road information includes road type information for enabling distinction of whether or not the road is a road for exclusive use by automobiles, for example.

<Control Processes Executed by Driving Support ECU 10>

Next, control processes executed by the driving support ECU 10 is described. While both of the lane trace assist control and the adaptive cruise control are being executed, the driving support ECU 10 performs the lane change assist control when the lane change assist request is accepted. In view of this, the lane trace assist control and the adaptive cruise control are first described.

<Lane Trace Assist Control (LTA)>

The lane trace assist control applies the steering torque to the steering mechanism so that the position of the own vehicle is maintained in a vicinity of the target travel line inside a "lane in which the own vehicle is traveling", thereby assisting the steering operation of the driver. In this embodiment, the target travel line is the lane center line CL, but a line offset in the lane width direction by a predetermined distance from the lane center line CL can also be adopted as the target travel line. Therefore, the lane trace assist control can be expressed as being control for assisting a steering operation so that the travel position of the own vehicle is maintained in a fixed position in the lane width direction in the lane.

Hereinafter, the lane trace assist control is called an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has different names. Thus, a brief description is now given of the LTA.

The driving support ECU 10 is configured to perform the LTA when the LTA is requested through the operation on the setting operation unit 14. When the LTA is requested, the driving support ECU 10 calculates a target steering angle $\theta_{lta}*$ every time a predetermined calculation period elapses in accordance with Expression (1) based on the above-mentioned lane-related vehicle information (Cu, Dy, and θy).

$$\theta_{lta}* = K_{lta}1 \cdot Cu + K_{lta}2 \cdot \theta y + K_{lta}3 \cdot Dy + K_{lta}4 \cdot \Sigma Dy \qquad (1)$$

In the Expression (1), $K_{lta}1$, $K_{lta}2$, $K_{lta}3$, and $K_{lta}4$ are control gains. The first term on the right-hand side is a steering angle component that is determined in accordance with the curvature Cu of the road and acts in a feed-forward manner. The second term on the right-hand side is a steering angle component that acts in a feed-back manner so that the yaw angle θy is decreased (so that a difference between the direction of the own vehicle and the lane center line CL is decreased). That is, the second term on the right-hand side is the steering angle component calculated through feed-back control wherein the target value of the yaw angle θy is set to zero. The third term on the right-hand side is a steering angle component that acts in a feed-back manner so that a lateral deviation difference Dy, which is a positional shift amount (positional difference) in the lane width direction of the own vehicle with respect to the lane center line CL, is decreased. That is, the third term on the right-hand side is the steering angle component calculated through feed-back control wherein the target value of the lateral deviation Dy is set to zero. The fourth term on the right-hand side is a steering angle component that acts in a feed-back manner so that an integral value ΣDy of the lateral deviation Dy is decreased. That is, the fourth term on the right-hand side is the steering angle component calculated through feed-back control wherein the target value of the integral value ΣDy is set to zero.

The target steering angle $\theta_{lta}*$ is set to the steering angle for the left direction, for example, when the lane center line CL is curved in the left direction, and/or when the own vehicle is laterally shifted in the right direction with respect to the lane center line CL, and/or when the own vehicle is facing the right direction with respect to the lane center line CL. Further, the target steering angle $\theta_{lta}*$ is set to the steering angle for the right direction when the lane center line CL is curved in the right direction, and/or when the own vehicle is laterally shifted in the left direction with respect to the lane center line CL, and/or when the own vehicle is facing the left direction with respect to the lane center line CL. Therefore, the driving support ECU 10 calculates the target steering angle $\theta_{lta}*$ in accordance with the Expression (1) while using signs corresponding to the right/left directions.

The driving support ECU 10 outputs, to the EPS ECU 20, a command signal representing the target steering angle $\theta_{lta}*$ that is the calculation result. The EPS ECU 20 controls the drive of the steering motor 22 so that the steering angle follows the target steering angle $\theta_{lta}*$. In this embodiment, the driving support ECU 10 outputs the command signal representing the target steering angle $\theta_{lta}^*$ to the EPS ECU 20, but the driving support ECU 10 may calculate a target torque for obtaining the target steering angle $\theta_{lta}^*$, and output, to the EPS ECU 20, a command signal representing the target torque that is the calculation result. The above is the outline of the LTA.

<Adaptive Cruise Control (ACC)>

The adaptive cruise control refers to the following control. When a preceding vehicle traveling ahead of (in front of) the own vehicle is present, the own vehicle is caused to follow the preceding vehicle while maintaining an inter-vehicle distance between the preceding vehicle and the own vehicle at a predetermined distance, based on the surrounding information. When no preceding vehicle is determined to be present based on the surrounding information, the own vehicle is caused to travel at a constant setting vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description is now given of the ACC.

The driving support ECU 10 is configured to perform the ACC when the ACC is requested through the operation on the setting operation unit 14. That is, the driving support ECU 10 is configured to select a following target vehicle (that is, the vehicle to be tracked) based on the surrounding information acquired from the surrounding sensors 11 when the ACC is requested. For example, the driving support ECU 10 determines whether or not an other vehicle is present in a following target vehicle area defined in advance.

When an other vehicle is present in the following target vehicle area for a time equal to or longer than a predetermined time, the driving support ECU 10 selects that other vehicle as the following target vehicle, and sets a target acceleration so that the own vehicle follows the following target vehicle while keeping a predetermined inter-vehicle distance between the own vehicle and the following target vehicle. When the other vehicle is not present in the following target vehicle area, the driving support ECU 10 sets the target acceleration based on the set vehicle speed and the detected speed (vehicle speed detected by the vehicle speed sensor) so that the speed of the own vehicle becomes equal to the set vehicle speed.

The driving support ECU 10 uses the engine ECU 50 to control the engine actuator 51, and, when necessary, uses the brake ECU 60 to control the brake actuator 61 so that the acceleration of the own vehicle becomes equal to (matches) the target acceleration. When an accelerator operation is performed by the driver during the ACC, the accelerator operation is prioritized, and an automatic deceleration control for keeping the inter-vehicle distance between the preceding vehicle and the own vehicle is not performed. The above is the outline of the ACC.

<Lane Change Assist Control (LCA)>

The lane change assist control refers to the following control. When the surroundings of the own vehicle is monitored and it is determined that the own vehicle can safely change lanes, the steering torque is applied to the steering mechanism so that the own vehicle is moved from the lane in which the own vehicle is currently traveling to the adjacent lane while the surroundings of the own vehicle continues being monitored. Thus, the steering operation performed by the driver (lane change operation) is assisted. Therefore, with the lane change assist control, the lane in which the own vehicle travels can be changed without the steering operation by the driver (steering wheel operation). In the following, the lane change assist control is referred to as an "LCA".

Similarly to the LTA, the LCA is control of a lateral position of the own vehicle with respect to the lane, and is performed in place of the LTA when the lane change assist request is accepted while the LTA and the ACC are being performed. In the following, the LTA and the LCA are collectively referred to as a "steering assist control", and the state of the steering assist control is referred to as a "steering assist control state".

The steering assist device performs control for assisting the steering operation by the driver. Therefore, when the steering assist control (the LTA and the LCA) is being executed, the driving support ECU 10 generates the steering torque for steering assist control in such a manner that the steering wheel operation by the driver is prioritized. As a result, the driver can cause the own vehicle to move in an intended direction based on the steering wheel operation performed by the driver even when the steering assist control is being executed.

Figure 5:
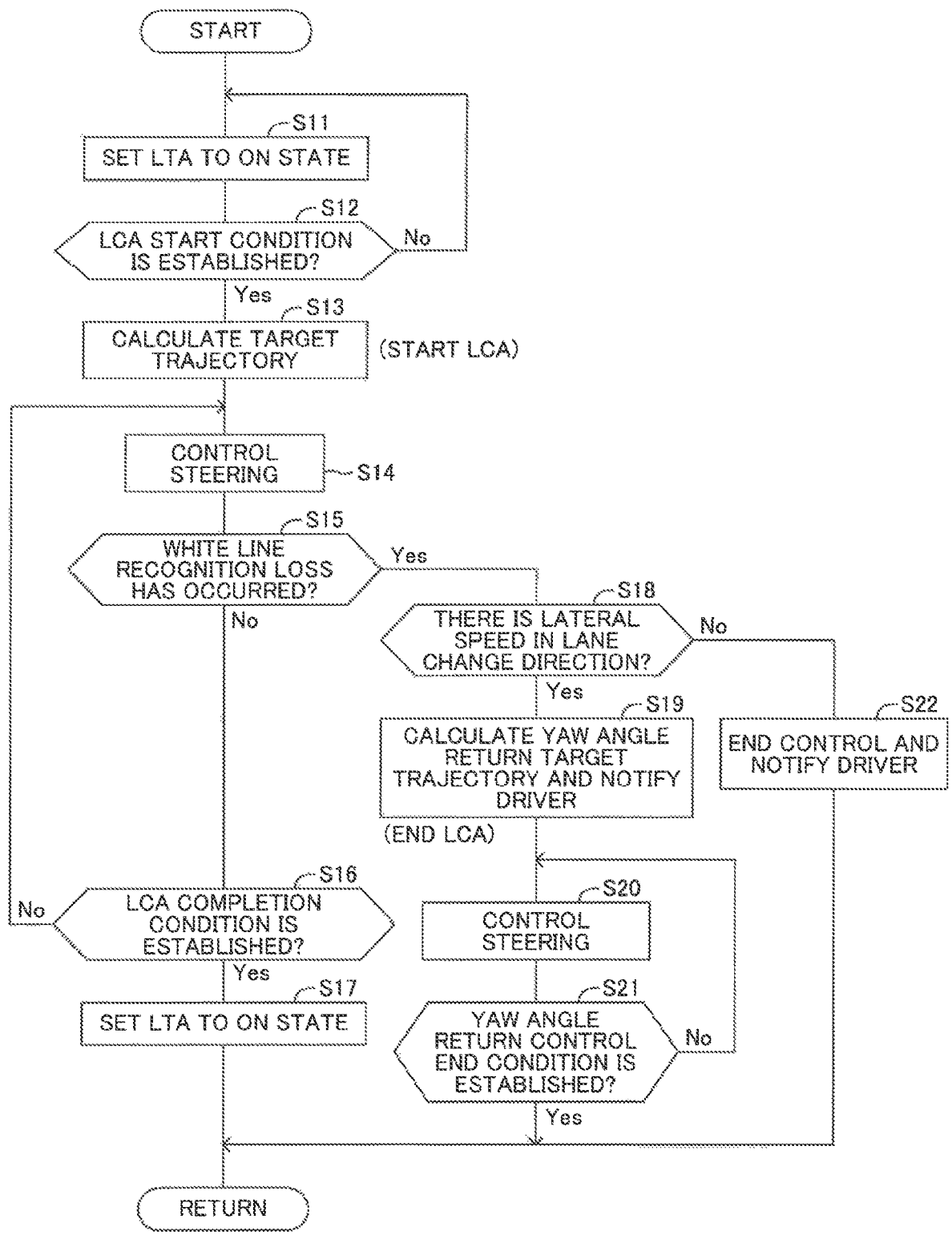
FIG. 5 is a flowchart for illustrating a steering assist control routine.

FIG. 5 is a flowchart for illustrating a steering assist control routine executed by the driving support ECU 10. The steering assist control routine is executed when an LTA execution permission condition is established. The LTA execution permission condition may be satisfied, for example, when an execution of the LTA is selected through the setting operation unit 14, the ACC is being performed, and the white lines of the lane are recognized by the camera sensor 12.

When and after the steering assist control routine is started, the driving support ECU 10 sets the steering assist control state to an LTA ON state at Step S11. The LTA ON state represents the control state in which the LTA is (to be) executed.

Next, at Step S12, the driving support ECU 10 determines whether or not an LCA start condition is established.

The LCA start condition is established when, for example, all of the following conditions are established.

1. A lane change assist request operation (lane change assist request signal) is detected.

2. The execution of the LCA is selected through the setting operation unit 14.

3. The white line which is present in the turn signal operation direction (the white line serving as a boundary between an original lane and a target lane) is a broken line.

4. The result of determining whether or not the LCA is allowed to be performed through the monitoring of the surroundings is YES (that is, an other vehicle or the like which has a probability to become an obstacle to changing lanes (during the lane change) is not detected based on the surrounding information acquired from the surrounding sensors 11, and thus, it is determined that the own vehicle can safely change lanes).

5. The road is the road for exclusive use by automobiles (road type information acquired from the navigation ECU 70 indicates a road exclusively for automobiles).

6. The vehicle speed of the own vehicle is within an LCA permitted vehicle speed range in which the LCA is allowed to be performed.

For example, the condition 4 is established when the inter-vehicle distance between the own vehicle and the other vehicle when the lane change is completed is predicted/estimated to be an appropriate distance or longer based on the relative speed between the own vehicle and the other vehicle traveling in the target lane.

It should be noted that the LCA start conditions are not limited to the above-mentioned conditions, and can be set as appropriate.

When it is determined that the LCA start condition is not established, the driving support ECU 10 returns the processing to Step S11, and continues to perform/execute the LTA.

When the LCA start condition is established while the LTA is being performed/executed (Step S12: Yes), the driving support ECU 10 starts LCA in place of the LTA performed/executed until that point. The driving support ECU 10 transmits an LCA start guidance display command to the meter ECU 30 when starting LCA. As a result, LCA start guidance is displayed on the display unit 31.

Figure 6A:
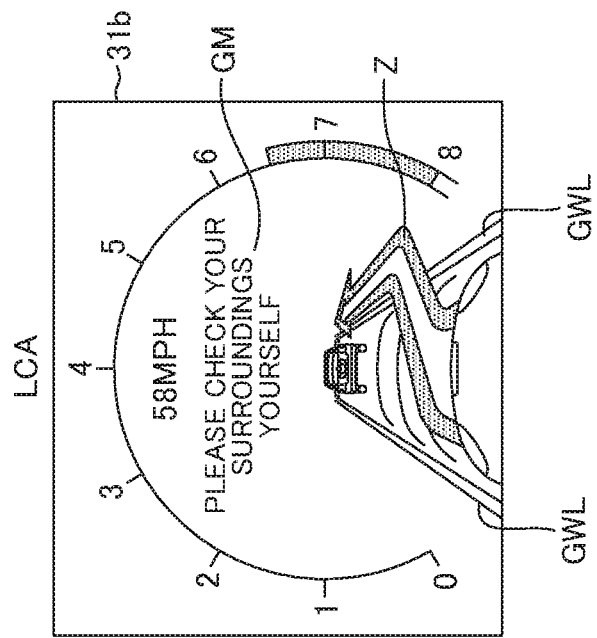
FIG. 6A is a diagram for illustrating an LTA screen of a display unit.
Figure 6B:
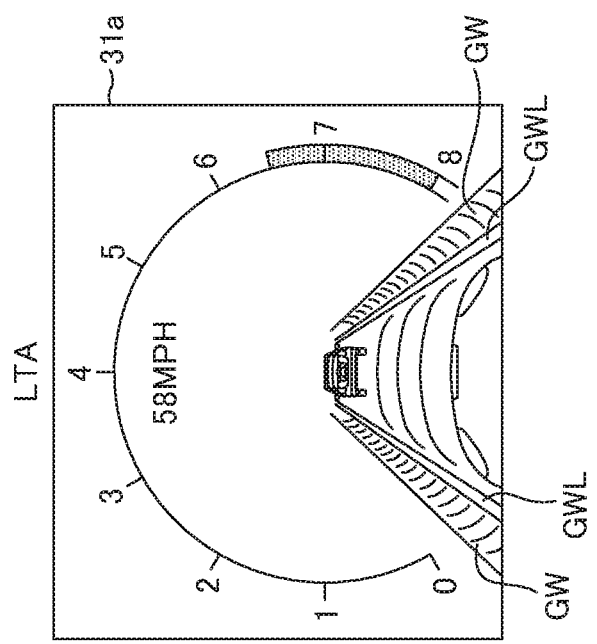
FIG. 6B is a diagram for illustrating an LCA screen of a display unit.

FIG. 6A is a diagram for illustrating an example of a screen 31a (referred to as LTA screen 31a) displayed on the display unit 31 during execution of the LTA and FIG. 6B is a diagram for illustrating an example of a screen 31b (referred to as an LCA screen 31b) displayed during execution of LCA. An image in which the own vehicle is traveling between the right and left white lines is displayed on the LTA screen 31a and on the LCA screen 31b. On the LTA screen 31a, virtual walls GW are displayed on an outer side of each of right and left white line displays GWL. The driver can recognize from those walls GW that the own vehicle is being controlled so as to travel within the lane.

On the other hand, on the LCA screen 31b, the virtual walls GW are not displayed, but an LCA trajectory Z is displayed in place of the virtual walls GW. The driving support ECU 10 switches the screen to be displayed on the display unit 31 between the LTA screen 31a and the LCA screen 31b depending on the steering assist control state. As a result, the driver can easily discriminate/recognize which steering assist control is being performed, the LTA or the LCA.

The LCA is merely aimed to assist the steering operation performed by the driver for changing lanes. Thus, the driver is responsible for monitoring (or is required to pay attention to) the surroundings. Therefore, a message GM, namely, "Please check your surroundings by yourself", for causing the driver to monitor his or her surroundings is displayed on the LCA screen 31b.

When and after the LCA starts, the driving support ECU 10 firstly calculates the target trajectory at Step S14 of a routine illustrated in FIG. 5. The LCA target trajectory is now described.

Figure 7:
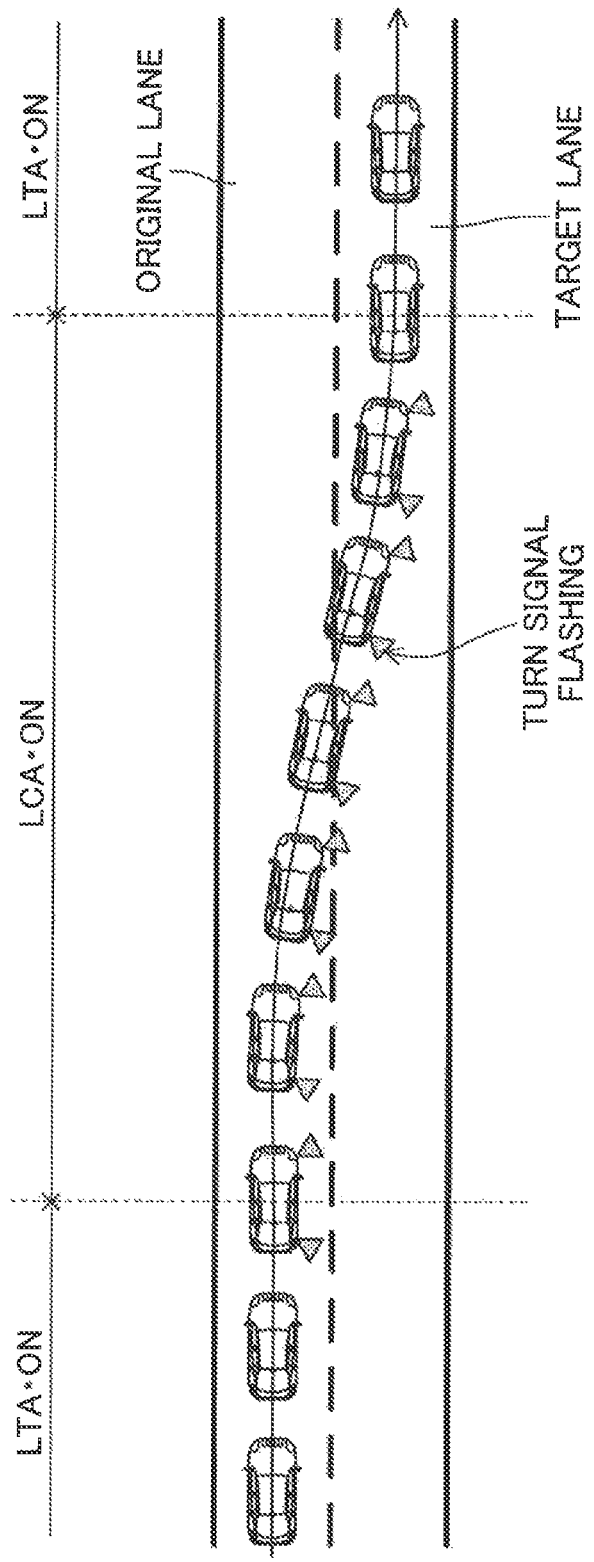
FIG. 7 is a diagram for illustrating a trajectory of an own vehicle.

When performing/executing LCA, the driving support ECU 10 calculates a target trajectory function for deciding the target trajectory of the own vehicle. The target trajectory is a trajectory along which the own vehicle is moved for a target lane change time period from the lane (referred to as the "original lane") in which the own vehicle is currently traveling to the center position in the width direction (referred to as a "final target lateral position") of the lane (referred to as the "target lane") present in the lane change assist request direction, which is adjacent to the original lane. The target trajectory has, for example, a shape as illustrated in FIG. 7.

The target trajectory function is, as described later, a function for calculating a target value of the lateral position (i.e., target lateral position) of the own vehicle with respect to the lane center line CL of the original lane serving as a reference, the target value corresponding to an elapsed time t which is a time from an LCA start time point (time point at which LCA start condition becomes established) and is a variable of the function. The lateral position of the own vehicle represents the position of the center of gravity of the own vehicle in the lane width direction (also referred to as a "lateral direction") with respect to the lane center line CL serving as a reference.

The target lane change time is varied in proportion to a distance (hereinafter referred to as a "required lateral distance") for which the own vehicle is to move in the lateral direction from an initial position to a final target lateral position. The initial position is an LCA start position (lateral position of the own vehicle at the LCA start time point). For example, when the lane width is 3.5 m as in the case of general roads, the target lane change time is set to, for example, 8.0 seconds. This example corresponds to a case in which the own vehicle is positioned on the lane center line CL of the original lane at the LCA start time point. The target lane change time is adjusted in proportion to the width of the lane. Therefore, the target lane change time is set to a larger value as the lane is wider, and conversely, to a smaller value as the lane is narrower.

Further, when the lateral-direction position of the own vehicle at the LCA start time point is shifted/deviated to the lane change side with respect to the lane center line CL of the original lane, the target lane change time is made smaller as the shift amount (lateral deviation Dy) of the own vehicle is larger. On the other hand, when the lateral-direction position of the own vehicle at the start of the LCA is shifted/deviated to the opposite side of the lane change side with respect to the lane center line CL of the original lane, the target lane change time period is made smaller as the shift amount (lateral difference Dy) is larger. For example, when the shift amount is 0.5 m, the increase/decrease adjustment amount of the target lane change time may be 1.14 seconds (=8.0×0.5/3.5). The values for the target lane change time described here are mere examples, and are arbitrarily values can be used.

In this embodiment, a target lateral position y is calculated based on a target trajectory function y(t) represented by Expression (2). The lateral position function y(t) is a fifth-order function in which the elapsed time t is a variable.

$$y(t)=c_0+c_1 \cdot t+c_2 \cdot t^2+c_3 \cdot t^3+c_4 \cdot t^4+c_5 \cdot t^5 \qquad (2)$$

This target trajectory function y(t) is set to a function such that the own vehicle is smoothly moved to a final target position.

In the Expression (2), the coefficients $c_0$, $c_1$, $c_2$, $c_3$, $c_4$, and $c_5$ are determined based on a state (referred to as an "initial lateral state amount") of the own vehicle when the LCA is started and a target state (referred to as a "final target lateral state amount) of the own vehicle when the LCA is completed.

Figure 8:
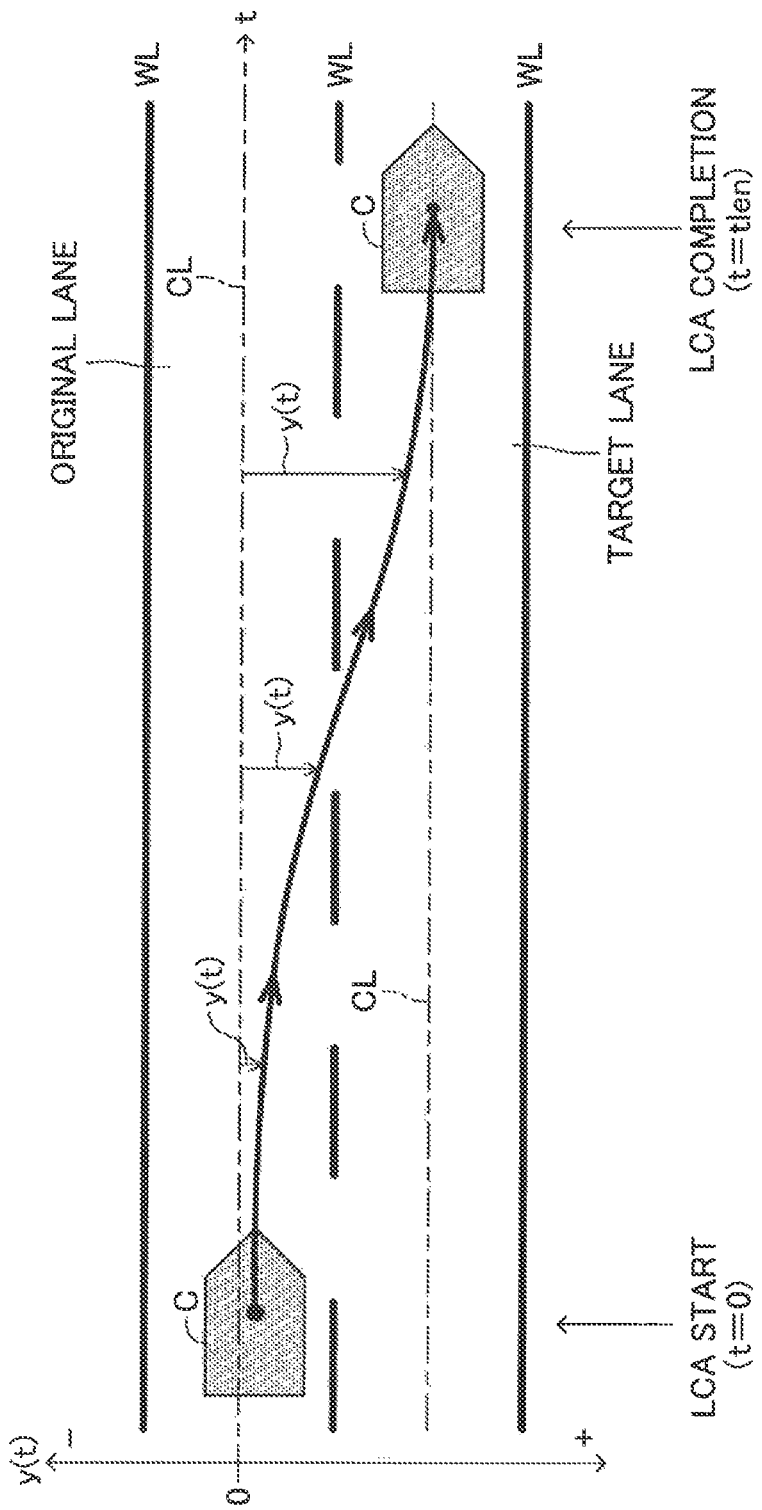
FIG. 8 is a diagram for illustrating a target trajectory function.

For example, as illustrated in FIG. 8, the target trajectory function y(t) is a function for calculating a target lateral position y(t) of an own vehicle C corresponding to an elapsed time t (also sometimes referred to as current time t) from the LCA start point (calculation point of the target trajectory), based on the lane center line CL of the lane (original lane) in which the own vehicle C is traveling at the current time point. In FIG. 8, the lane is formed in a straight line, but when the lane is formed in a curve, the target trajectory function y(t) is a function for calculating, based on the lane center line CL formed in a curve, the target lateral position of the own vehicle relative to the lane center line CL.

The driving support ECU 10 sets target trajectory calculation parameters in the following manner in order to determine the coefficients $c_0$, $c_1$, $c_2$, $c_3$, $c_4$, and $c_5$ of the target trajectory function y(t). The target trajectory calculation parameters include the following seven parameters (P1 to P7).

P1: a lateral position (referred to as an "initial lateral position") of the own vehicle relative to the lane center line of the original lane when the LCA is started (or at the LCA start time point).

P2: a speed (referred to as an "initial lateral speed") of the own vehicle in the lateral direction when the LCA is started (or at the LCA start time point).

P3: an acceleration (referred to as an "initial lateral acceleration") of the own vehicle in the lateral direction when the LCA is started (or at the LCA start time point).

P4: a target lateral position (referred to as the "final target lateral position") of the own vehicle relative to the lane center line of the original lane when the LCA is completed (referred to as an "LCA completion time point").

P5: a target speed (referred to as a "final target lateral speed") of the own vehicle in the lateral direction when the LCA is completed.

P6: a target acceleration (referred to as a "final target lateral acceleration") of the own vehicle in the lateral direction when the LCA is completed.

P7: a target time (referred to as the "target lane change time"), which is a target value of the time for performing the LCA (time from the LCA start time point to the LCA completion time point).

As described above, the lateral direction is the lane width direction. Therefore, the lateral speed represents the speed of the own vehicle in the width direction of the lane, and the lateral acceleration represents the acceleration of the own vehicle in the width direction of the lane.

The processes for setting those seven target trajectory calculation parameters is referred to as an "initialization processing". In this initialization processing, the target trajectory calculation parameters are set in the following manner. That is, the initial lateral position is set to a value equal to the lateral deviation Dy detected by the camera sensor 12 when the LCA is started (or at the LCA start time point). The initial lateral speed is set to a value (v·sin(θy)) obtained by multiplying a vehicle speed v detected by the vehicle speed sensor at the LCA start time point by a sine value sin(θy) of the yaw angle θy detected by the camera sensor 12 at the LCA start time point. The initial lateral acceleration is set to a value (v·γ) obtained by multiplying a yaw rate γ (rad/s) detected by the yaw rate sensor at the LCA start time point by the vehicle speed v at the LCA start time point. Instead, the initial lateral acceleration may be set to a derivative value of the initial lateral speed. The initial lateral position, the initial lateral speed, and the initial lateral acceleration are collectively referred to as the "initial lateral state amount".

The driving support ECU 10 is designed/configured to regard the lane width of the target lane as a lane width equal to the lane width of the original lane detected by the camera sensor 12. Therefore, the final target lateral position is set to the same value as the lane width of the original lane (i.e., the final target lateral position=the lane width of original lane). The driving support ECU 10 sets each of the final target lateral speed and the final target acceleration to zero. The final target lateral position, the final target lateral speed, and the final target lateral acceleration are collectively referred to as the "final target lateral state amount".

The target lane change time is, as described above, calculated based on the lane width (the lane width of the original lane may be used) and the lateral-direction shift amount of the own vehicle when LCA starts.

For example, a target lane change time $t_{len}$ is calculated by Expression (3).

$$t_{len}=D_{ini}\cdot A \quad (3)$$

In Expression (3), $D_{ini}$ is the required distance that the own vehicle is to be moved in the lateral direction from the LCA start position (initial lateral position) until an LCA completion position (final target lateral position). Therefore, when the own vehicle is positioned on the lane center line CL of the original lane, $D_{ini}$ is set to a value equivalent to the lane width, and when the own vehicle is shifted from the lane center line CL of the original lane, $D_{ini}$ is a value obtained by adding or subtracting that shift amount to/from the lane width. Symbol A is a constant (referred to as a target time setting constant) representing the target time to be taken in order to move the own vehicle in the lateral direction by a unit distance. For example, symbol A is set to (8 sec/3.5 m=2.29 sec/m). In this example, when the required distance $D_{ini}$ that the own vehicle is to be moved in the lateral is 3.5 m, the target lane change time $t_{len}$ is set to 8 seconds.

The target time setting constant A is not limited to the above-mentioned value, and can be set arbitrarily. For example, the target time setting constant A may be set to a value selected from a plurality of values in accordance with a preference of the driver using the setting operation unit 14. Alternatively, the target time setting constant A may be a fixed value.

The driving support ECU 10 calculates the coefficients $c_0$, $c_1$, $c_2$, $c_3$, $c_4$, and $c_5$ of the target trajectory function y(t) represented by the Expression (2) based on "the initial lateral state amount, the final target lateral state amount, and the target lane change time" determined through the initialization processing of the target trajectory calculation parameters, to thereby finalize/fix the target trajectory function y(t).

From the target trajectory function y(t) represented by the Expression (2), a lateral speed y'(t) of the own vehicle can be represented by Expression (4), and a lateral acceleration y'(t) of the own vehicle can be represented by Expression (5).

$$y'(t)=c_1+2c_2\cdot t+3c_3\cdot t^2+4c_4\cdot t^3+5c_5\cdot t^4 \quad (4)$$

$$y''(t)=2c_2+6c_3\cdot t+12c_4\cdot t^2+20c_5\cdot t^3 \quad (5)$$

In the Expressions (4) and (5), when the initial lateral position is expressed as $y_0$, the initial lateral speed is expressed as $vy_0$, the initial lateral acceleration is expressed as $ay_0$, the final target lateral position is expressed as $y_1$, the final target lateral speed is expressed as $vy_1$, the final target lateral acceleration is expressed as $ay_1$, and the lane width of the original lane is expressed as W, the following relational expressions are obtained based on the above-mentioned target trajectory calculation parameters.

$$y(0)=c_0=y_0 \quad (6)$$

$$y'(0)=c_1=vy_0 \quad (7)$$

$$y''(0)=2c_2=ay_0 \quad (8)$$

$$y(t_{len})=c_0+c_1\cdot t_{len}+c_2\cdot t_{len}^2+c_3\cdot t_{len}^3+c_4\cdot t_{len}^4+c_5\cdot t_{len}^5=y_1=W \quad (9)$$

$$y'(t_{len})=c_1+2c_2\cdot t_{len}+3c_3\cdot t_{len}^2+4c_4\cdot t_{len}^3+5c_5\cdot t_{len}^4=vy_1=0 \quad (10)$$

$$y''(t_{len})=2c_2+6c_3\cdot t_{len}+12c_4\cdot t_{len}^2+20c_5\cdot t_{len}^3=ay_1=0 \quad (11)$$

Therefore, the values of the coefficients $c_0$, $c_1$, $c_2$, $c_3$, $c_4$, and $c_5$ of the target trajectory function y(t) can be calculated from the six Expressions (6) to (11). The target trajectory function y(t) is fixed/finalized by substituting the values of the calculated coefficients $c_0$, $c_1$, $c_2$, $c_3$, $c_4$, and $c_5$ into the Expression (2). The driving support ECU 10 stores and maintains that fixed/finalized target trajectory function y(t) until the LCA is terminated. At the same time as finalizing the target trajectory function y(t), the driving support ECU 10 also activates a clock timer (initial value: zero) to start counting the elapsed time t from the LCA start time point.

When the target trajectory function has been fixed/finalized in the above manner, the driving support ECU 10 performs steering control based on the target trajectory function at Step S14. The steering control is now specifically described.

First, the driving support ECU 10 calculates a target lateral state amount of the own vehicle at the current time point. The target lateral state amount includes:

the target lateral position which is a target value for/of the lateral position of the own vehicle in the lane width direction;

the target lateral speed which is a target value for/of the speed (lateral speed) of the own vehicle in the lane width direction; and the target lateral acceleration which is a target value for/of the acceleration (lateral acceleration) of the own vehicle in the lane width direction.

The lateral speed and the lateral acceleration are sometimes collectively referred to as a "lateral movement state amount", and the target lateral speed and the target lateral acceleration are sometimes collectively referred to as the "target lateral movement state amount".

The driving support ECU 10 calculates, based on the target trajectory function y(t) finalized at Step S13 and the current time t, the target lateral position at the current time point, the target lateral speed at the current time point, and the target lateral acceleration at the current time point. The current time t is the time that has elapsed since the target trajectory function y(t) was finalized at Step S14, and is the same as the elapsed time from the start of the LCA. When the target trajectory function y(t) is finalized at Step S14, the driving support ECU 10 resets the clock timer and starts to count the elapsed time t (=current time t) from the start of the LCA (LCA start time point). The target lateral position is calculated through substituting the current time t into the target trajectory function y(t). The target lateral speed is calculated through substituting the current time t into a function y'(t) obtained through first-order differentiation of the target trajectory function y(t), and the target lateral acceleration is calculated through substituting the current time t into a function y''(t) obtained through second-order differentiation of the target trajectory function y(t). The driving support ECU 10 reads the elapsed time t measured by the clock timer to calculate the target lateral state amount based on the measured time t and the above-mentioned functions.

In the following description, the target lateral position at the current time is expressed as y*, the target lateral speed at the current time is expressed as vy*, and the target lateral acceleration at the current time is expressed as ay*.

Subsequently, the driving support ECU 10 calculates a target yaw state amount which is a target amount relating to movement for changing the direction of the own vehicle. The target yaw state amount includes a target yaw angle θy* of the own vehicle at the current time point, a target yaw rate γ* of the own vehicle at the current time point, and a target curvature Cu* at the current time point. The target curvature Cu* is the curvature of the trajectory for causing the own vehicle to change lanes, namely, the curvature of the curve component relating only to the lane change. In other words, the target curvature Cu* does not include the curvature of the lane.

The driving support ECU 10 reads the vehicle speed v at the current time point (the current vehicle speed detected by the vehicle speed sensor at the current time), and calculates the target yaw angle θy* at the current time point, the target yaw rate γ* at the current time point, and the target curvature Cu* at the current time point by using Expressions (12), (13), and (14) described below, based on the read vehicle speed v, a target lateral speed vy*, and a target lateral acceleration ay*.

$$\theta y^* = \sin^{-1}(vy^*/v) \tag{12}$$

$$\gamma^* = ay^*/v \tag{13}$$

$$Cu^* = ay^*/v^2 \tag{14}$$

Specifically, the target yaw angle θy* is calculated through substituting a value obtained by dividing the target lateral speed vy* by the vehicle speed v into an arcsine function. The target yaw rate γ* is calculated through dividing the target lateral acceleration ay* by the vehicle speed v. The target curvature Cu* is calculated through dividing the target lateral acceleration ay* by the square of the vehicle speed v.

Next, the driving support ECU 10 calculates a target control amount of the LCA. In this embodiment, a target steering angle $\theta_{lca}^*$ is calculated as the target control amount. The target steering angle $\theta_{lca}^*$ is calculated through Expression (15) based on the target lateral position y*, the target yaw angle θy*, the target yaw rate γ*, the target curvature Cu*, and the curvature Cu, calculated in the manner described above.

$$\theta_{lca}^* = K_{lca}1 \cdot (Cu^* + Cu) + K_{lca}2 \cdot (\theta y^* - \theta y) + K_{lca}3 \cdot (y^* - y) + K_{lca}4 \cdot (y^* - \gamma) + K_{lca}5 \cdot \Sigma(y^* - y) \tag{15}$$

In the Expression (15), each of $K_{lca}1$, $K_{lca}2$, $K_{lca}3$, $K_{lca}4$, and $K_{lca}5$ represents a control gain. The parameter Cu represents the curvature at the current time point (at the calculation of $\theta_{lca}^*$) detected by the camera sensor 12. The parameter y represents the lateral position at the current time point (at the calculation of $\theta_{lca}^*$) detected by the camera sensor 12, namely, y corresponds to Dy. The parameter θy represents the yaw angle at the current time point (at the calculation of $\theta_{lca}^*$) detected by the camera sensor 12. The parameter γ represents the yaw rate of the own vehicle at the current time point detected by the yaw rate sensor. The derivative value of the yaw angle θy can alternatively be used as γ.

The first term on the right-hand side is a feed-forward control amount determined in accordance with a value obtained by adding the target curvature Cu* and the curvature Cu (curve of the lane). $K_{lca}1 \cdot Cu^*$ is the feed-forward control amount for performing lane change. $K_{lca}1 \cdot Cu$ is the feed-forward control amount for causing the own vehicle to travel along the curve of the lane. Therefore, the control amount represented by the first term on the right-hand side is basically set to a value capable of causing the own vehicle to travel along a target travel path when the steering angle is controlled according to that control amount. In this case, the control gain $K_{lca}1$ is set to a value that varies depending on the vehicle speed v. For example, the control gain $K_{lca}1$ may be set in accordance with Expression (16) below based on a wheel base L and a stability factor Ksf (fixed value determined for each vehicle). In this case, K is a fixed control gain.

$$K_{lca}1 = K \cdot L \cdot (1 + Ksf \cdot v^2) \quad (16)$$

Each of the second to fifth terms on the right-hand side in the Expression (15) represents a feedback control amount. The second term on the right-hand side represents a steering angle component for providing feedback so as to reduce a deviation between the target yaw angle $\theta y^*$ and an actual yaw angle $\theta y$. The third term on the right-hand side represents a steering angle component for providing feedback so as to reduce a deviation between the target lateral position $y^*$ and an actual lateral position y. The fourth term on the right-hand side represents a steering angle component for providing feedback so as to reduce a deviation between the target yaw rate $\gamma^*$ and an actual yaw rate $\gamma$. The fifth term on the right-hand side represents a steering angle component for providing feedback so as to reduce an integral value $\Sigma(y^*-Y)$ of a deviation between the target lateral position $y^*$ and the actual lateral position y.

The target steering angle $\theta_{lca}^*$ is not limited to an angle calculated based on the above-mentioned five steering components. The target steering angle $\theta_{lca}^*$ may be calculated using only arbitrary steering components selected from those five steering components, or may also be calculated using other steering components in addition to the five steering components. For example, regarding the feedback control amount relating to yaw movement, any one of a deviation in the yaw angle and a deviation in the yaw rate can be used. Further, the feedback control amount obtained using the integral value $\Sigma(y^*-Y)$ of the deviation between the target lateral position $y^*$ and the actual lateral position y can be omitted.

When the target control amount has been calculated, the driving support ECU 10 transmits the steering command representing the target control amount to the EPS ECU 20. In this embodiment, the driving support ECU 10 calculates the target steering angle $\theta_{lca}^*$ as the target control amount, but the driving support ECU 10 may calculate a target torque for obtaining the target steering angle $\theta_{lca}^*$, and transmit a steering command representing that target torque to the EPS ECU 20.

The processing described above is the processing of Step S14.

When the EPS ECU 20 receives the steering command from the driving support ECU 10 via the CAN 100, the EPS ECU 20 drives the steering motor 22 in such a manner that the steering angle follows (becomes equal to) the target steering angle $\theta_{lca}^*$.

Next, in Step S15, the driving support ECU 10 determines whether or not white line recognition loss has occurred. White line recognition loss is a state in which the white lines WL are not recognizable by the camera sensor 12, namely, a state in which the lane is not recognizable. White line recognition loss also includes a state in which the camera sensor 12 can recognize the white lines WL, but the reliability of that recognition state is lower than a standard. Therefore, white line recognition loss is a state in which the lane is not properly recognized, and corresponds to the recognition failure state of the present invention.

For example, in order to recognize the white lines WL, the camera sensor 12 extracts the edges of the white lines based on a photographed image. However, when edge extraction is difficult, white line recognition loss is determined to have occurred. When the output of white line recognition is unstable (so-called output skipping is occurring), there is a possibility of the white lines being incorrectly recognized, and thus the camera sensor 12 determines that white line recognition loss has occurred. Further, when the camera sensor 12 can recognize the white lines, but those white lines are faint, the camera sensor 12 determines that white line recognition loss has occurred. When there are many white line candidates that can be estimated as being white lines, the lane is not properly identified, and thus the camera sensor 12 determines that white line recognition loss has occurred. Still further, the camera sensor 12 may determine that white line recognition loss has occurred under a state in which executing steering assist control is difficult, such as when the calculated curvature Cu is a sharp curve exceeding a standard, or when the calculated yaw angle $\theta y$ represents a large value exceeding a standard. The camera sensor 12 can also determine that white line recognition loss has occurred when the white line in the lane change direction (boundary white line between the original lane and the target lane) changes from a broken line to a solid line. Detection (determination) of white line recognition loss can be performed not only by the camera sensor 12 alone, but also by the camera sensor 12 and the driving support ECU 10 working in cooperation.

When it is determined that white line recognition loss has occurred, the camera sensor 12 transmits a white line recognition loss signal to the driving support ECU 10. In Step S15, the driving support ECU 10 determines whether or not a white line recognition loss signal from the camera sensor 12 has been transmitted.

When it is determined that white line recognition loss has not occurred (Step S15: No), the driving support ECU 10 advances the processing to Step S16.

In Step S16, the driving support ECU 10 determines whether or not an LCA completion condition is established. In this embodiment, the LCA completion condition is established when the lateral position y of the own vehicle has reached the final target lateral position $y^*$. When the LCA completion condition is not established, the driving support ECU 10 returns the processing to Step S14, and repeats the processing of Steps S14 to S16 at a predetermined calculation cycle. In this way, the LCA is continued.

While the LCA is being performed, the target lateral state amount ($y^*$, $vy^*$, and $ay^*$) that varies depending on the elapsed time t are calculated. In addition, based on the calculated target lateral state amount ($y^*$, $vy^*$, and $ay^*$) and the vehicle speed v, the target yaw state amount ($\theta y^*$, $\gamma^*$, and $Cu^*$) are calculated. Furthermore, based on the calculated target yaw state amount ($\theta y^*$, $\gamma^*$, and $Cu^*$), the target control amount ($\theta_{lca}^*$) is calculated. Every time the target control amount ($\theta_{lca}^*$) is calculated, a steering command representing the target control amount ($\theta_{lca}^*$) is transmitted to the EPS ECU 20. In this manner, the own vehicle travels along the target trajectory.

It should be noted that, when the travel position of the own vehicle has changed during the LCA from a position in the original lane to a position in the target lane, the lane-related vehicle information (Cu, Dy, and $\theta y$) supplied to the driving support ECU 10 from the camera sensor 12 changes from lane-related vehicle information with respect to the original lane to lane-related vehicle information with respect to the target lane. Thus, when this position change has occurred, it becomes impossible to continue using the target trajectory function y(t) initially calculated when the LCA started as it is. Meanwhile, when the lane in which the own vehicle is present changes, the sign of the lateral deviation Dy reverses. Therefore, when the driving support ECU 10 detects that the sign (plus or minus) of the lateral deviation Dy output by the camera sensor 12 has changed, the driving support ECU 10 offsets/shifts the target trajectory function y(t) by the lane width W of the original lane. This enables the target trajectory function y(t) calculated using the lane center line CL of the original lane as an origin to be converted into the target trajectory function y(t) which uses the lane center line CL of the target lane as an origin.

When it is determined in Step S16 that the LCA completion condition is established, in Step S17, the driving support ECU 10 sets the steering assist control state to an LTA ON state, that is, completes the LCA and restarts the LTA. As a result, steering is controlled so that the own vehicle travels along the lane center line CL of the target lane. When the steering assist control state is set to an LTA ON state in Step S17, the driving support ECU 10 returns the processing to Step S11, and continues the steering assist control routine described above as is.

When the LCA is complete and the steering assist control state is set to an LTA ON state, the screen displayed on the display unit 31 is switched to the LTA screen 31a from the LCA screen 31b, as illustrated in FIGS. 6A and 6B.

During the period from the start of the LCA to the termination of the steering assist control routine, the driving support ECU 10 transmits to the meter ECU 30 a flashing command of the turn signal 32 of the turn signal operation direction. The turn signal 32 intermittently flashes based on a flashing command transmitted from the steering ECU 40 owing to an operation for the turn signal lever 41 to the first stroke position P1L (P1R) from a time point before the LCA is started. The meter ECU 30 continues having the turn signal 32 intermittently flashing as long as the flashing command is being transmitted from the driving support ECU 10, even when and after the flashing command transmitted from the steering ECU 40 is stopped.

Next, a case where white line recognition loss has occurred is described. When it is determined in Step S15 that white line recognition loss has occurred, the driving support ECU 10 advances the processing to Step S18, and determines whether or not a lateral speed is being generated in the lane change direction. A case in which "a lateral speed is being generated in the lane change direction" means that the own vehicle is moving in the lane change direction. The lateral speed is determined by calculating a value (v·sin(θy)) obtained by multiplying the sine value sin(θy) of the yaw angle θy detected by the camera sensor 12 by the vehicle speed v detected by the vehicle speed sensor. The sine value sin(θy) and the vehicle speed v used for this multiplication are ones immediately before it is determined that white line recognition loss has occurred.

It suffices that the processing of Step S18 involves determining the presence/absence of a lateral speed in the lane change direction, and thus the processing can be performed by using only the yaw angle θy for the determination. The presence/absence of a lateral speed may also be estimated from the integral value of the yaw rate detected by the yaw rate sensor at the point when the LCA starts. Further, the presence/absence of a lateral speed may also be estimated from the integral value of the steering angle detected by the steering angle sensor at the point when the LCA starts, or based on the elapsed time from the start of the LCA. For example, the lateral speed is a value close to zero for a predetermined period immediately after the start of the LCA, and thus, during that predetermined period, it can be determined that a lateral speed in the lane change direction is not being generated.

When it is determined that a lateral speed in the lane change direction is being generated (Step S18: Yes), the driving support ECU 10 advances the processing to Step S19. The driving support ECU 10 may perform the determination regarding the presence/absence of the generation of a lateral speed in the lane change direction by determining whether or not the lateral speed in the lane change direction is larger than a threshold. This threshold is not limited to zero, and as described later, may be set to a value based on which a determination can be made regarding whether or not it is required to reduce the lateral speed of the own vehicle.

In Step S19, the driving support ECU 10 ends the LCA and calculates a target trajectory so that the own vehicle does not depart from the lane. This target trajectory is the target trajectory for returning the yaw angle of the own vehicle to the state immediately before the LCA. This target trajectory is hereinafter referred to as the yaw angle return target trajectory.

In Step S19, simultaneously with the calculation of the yaw angle return target trajectory, the driving support ECU 10 also notifies the driver of the fact that steering assist has ended. In this case, the driving support ECU 10 transmits an end-of-assist notification to the meter ECU 30, and causes the buzzer 13 to issue a "beeping" sound. When the meter ECU 30 receives the end-of-assist notification, the meter ECU 30 switches the LCA screen 31b, which had been displayed on the display unit 31 until that point (refer to FIG. 6B), to the steering assist OFF screen 31c illustrated in FIG. 11. On the steering assist OFF screen 31c, the white line displays GWL, the trajectory Z, and the message GM, which had been displayed until that point, are not displayed. From this steering assist OFF screen 31c, the driver is notified of the fact that the LCA and the LTA are not being executed, and that it is required to operate the steering wheel by himself or herself.

The steering assist OFF screen 31c is the same as the screen that is displayed when the LTA has been stopped due to the occurrence of white line recognition loss when executing the LTA. Next, the processing by the driving support ECU 10 that is executed when white line recognition loss occurred during the LTA is described. Similar to when the LCA is executed, during execution of the LTA, the driving support ECU 10 determines at a predetermined calculation cycle whether or not white line recognition loss has occurred. When it is determined that white line recognition loss has occurred, the driving support ECU 10 stops the LTA. This function part of the driving support ECU 10 corresponds to lane keep assist stop means. In this case, the driving support ECU 10 transmits an end-of-assist notification to the meter ECU 30, and causes the buzzer 13 to issue a "beeping" sound. Therefore, the screen displayed on the display unit 31 switches from the LTA screen 31a (refer to FIG. 6A) to the steering assist OFF screen 31c illustrated in FIG. 11. As a result, on the display unit 31, there is displayed a screen having the same display content as when white line recognition loss occurred during execution of the LCA.

When white line recognition loss has occurred, regardless of the type of steering assist control that had been executed until then (the LTA or the LCA), it is required for the driver to quickly start operating the steering wheel. Therefore, in order to avoid more information than is required from being provided to the driver, the same steering assist OFF screen 31c is displayed on the display unit 31 when white line recognition loss occurred during the LTA as when white line recognition loss occurred during execution of the LCA.

Next, calculation of the yaw angle return target trajectory to be executed in Step S19 is described. The yaw angle return target trajectory represents the target trajectory for setting the yaw angle of the own vehicle to zero (in other words, target trajectory for setting the lateral speed of the own vehicle in the lane change direction to zero). The LTA is executed immediately before the start of the LCA. As a result, when the LCA is started, the yaw angle is estimated to be a value close to zero. Therefore, the driving support ECU 10 returns the yaw angle generated by the LCA to the state immediately before the start of the LCA in order to calculate a yaw angle return target trajectory in which the target lateral speed vy* calculated from the LCA target trajectory function is eliminated (the target lateral speed vy* becomes zero).

This target trajectory during the LCA represents the target lateral position for the elapsed time from the start of the LCA. However, the yaw angle return target trajectory represents the target curvature for the elapsed time from the point when white line recognition loss is detected. The target control amount to be finally output to the EPS ECU 20 is set to a value obtained by multiplying a control gain (a coefficient for converting curvature into a steering angle, which can be the above-mentioned control gain $K_{lca}1$) by a value obtained by adding together this target curvature and the curvature (curvature of the curve of the lane) detected by the camera sensor 12 immediately before white line recognition loss is detected.

A method of returning the yaw angle to the state immediately before the start of the LCA is now described. The target control amount during the LCA is represented by the target steering angle $\theta_{lca}^*$. This target steering angle $\theta_{lca}^*$ includes, as shown by Expression (15), a feed-forward term ($K_{lca}1 \cdot Cu^*$) calculated from the target curvature $Cu^*$.

The change in the target curvature corresponds to a change in the steering angle, and can be grasped as a change in the yaw angle. Therefore, when white line recognition loss is detected, the yaw angle can be returned to the state immediately before the start of the LCA (the yaw angle is decreased by the amount of increase due to the LCA) by calculating the integral value of the target curvature $Cu^*$ during the period from the start of the LCA until white line recognition loss is detected, reversing the sign of the control amount corresponding to the integral value of the target curvature $Cu^*$, and outputting the control amount to the EPS ECU 20.

Figure 9:
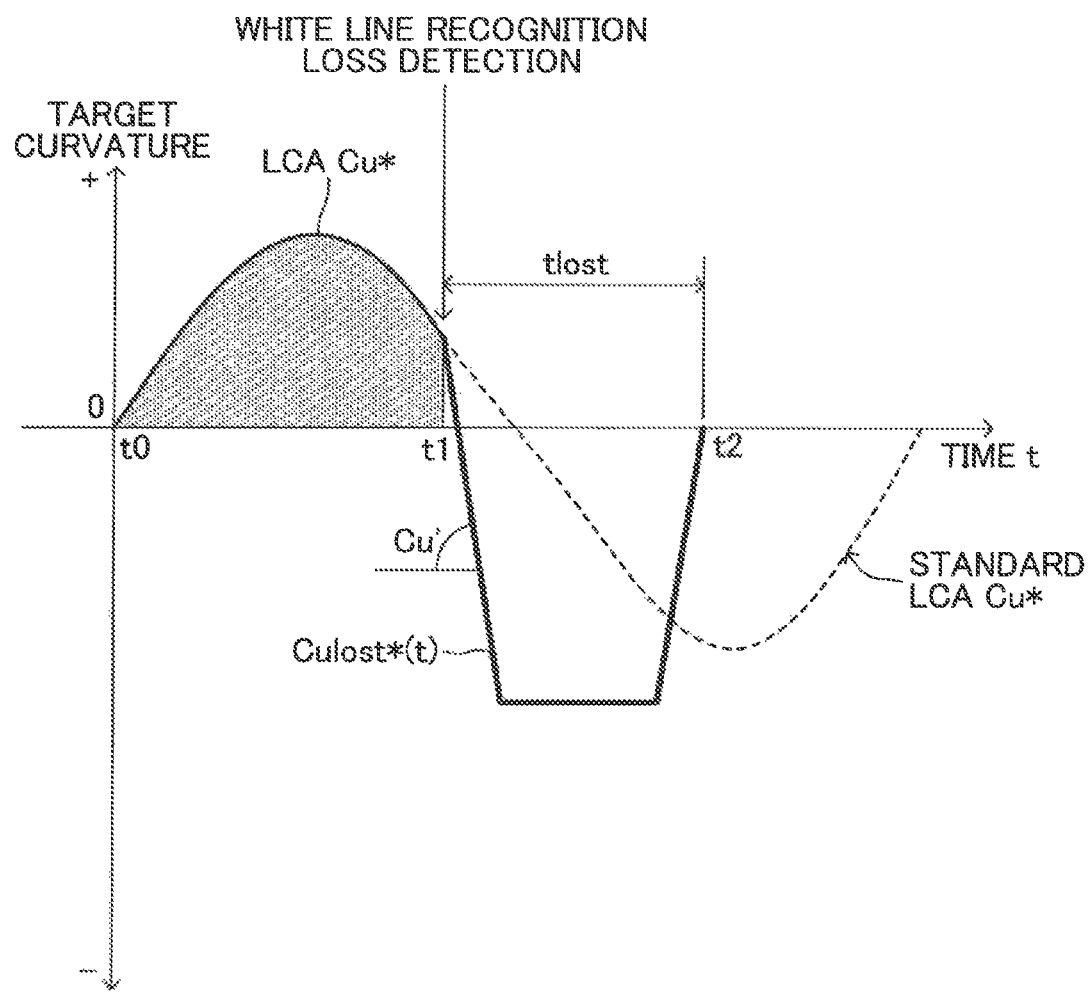
FIG. 9 is a graph for showing a target curvature.

For example, as shown in FIG. 9, when white line recognition loss is detected at a time t1, the integral value of the target curvature $Cu^*$ from a time t0 at which the LCA starts to the time t1 corresponds to the surface area of the portion colored in gray in FIG. 9. Therefore, when the sign of the feed-forward control amount corresponding to that surface area is reversed (the left-right direction is reversed) and the feed-forward control amount is issued as a command to the EPS ECU 20, the yaw angle can be returned to the state immediately before the start of the LCA at the point when output of the feed-forward control amount is complete. The value obtained by reversing the sign (plus or minus) of the integral value of the target curvature $Cu^*$ from the time t0 to the time t1 is referred to as the inverse integral value. The integral value of the target curvature $Cu^*$ from the start of the LCA can be set to zero by adding this inverse integral value to the integral value of the target curvature $Cu^*$ from the time t0 to the time t1.

Immediately before the start of the LCA, the yaw angle is controlled so as to basically be maintained at zero by the LTA. Therefore, the lateral speed immediately before the start of the LCA is, basically, zero. In a white line recognition loss state, it is not possible to perform steering control using the detection value from the camera sensor 12. Therefore, the lateral speed of the own vehicle can be reduced to nearly zero by using the feed-forward control amount to return the yaw angle to the state immediately before the start of the LCA in the manner described above, even when white line recognition loss has occurred. More specifically, the own vehicle can be caused to travel parallel to the formation direction of the lane.

Therefore, as indicated by the thick solid line in FIG. 9, the driving support ECU 10 calculates the target curvature $Cu^*$ after the time t1. This target curvature $Cu^*$ is referred to as a yaw angle return target curvature $Cu_{lost}^*$. In this case, a target time from when white line recognition loss is detected until the yaw angle returns to the value immediately before the start of the LCA (target time from time t1 to time t2) is determined. This target time is referred to as a yaw angle return target time $t_{lost}$. The yaw angle return target time $t_{lost}$ is a fixed time, and is set to a time that does not cause a sense of unease to the driver due to the change in the yaw angle (e.g., 3 seconds).

A change in gradient Cu' of the yaw angle return target curvature $Cu_{lost}^*$ is determined in advance. Therefore, if the magnitude of the inverse integral value can be calculated, the shape of the yaw angle return target curvature $Cu_{lost}^*$ (trapezoid shape) is determined. In this case, as the inverse integral value is larger, the maximum value of the yaw angle return target curvature $Cu_{lost}^*$ is larger. As used herein, magnitude refers to the absolute value.

The driving support ECU 10 calculates, based on the magnitude of the inverse integral value, the yaw angle return target time $t_b$, and the change in gradient Cu', the yaw angle return target curvature $Cu_{lost}^*$ for the elapsed time t from the point when white line recognition loss is detected (time t1). In the following description, the yaw angle return target curvature $Cu_{lost}^*$ for the elapsed time t is sometimes referred to as the yaw angle return target curvature function $Cu_{lost}^*$(t). The yaw angle return target curvature function $Cu_{lost}^*$(t) determines the target trajectory of the own vehicle. Therefore, this yaw angle return target curvature function $Cu_{lost}^*$(t) corresponds to the yaw angle return target trajectory.

The inverse integral value can be calculated each time the target curvature $Cu^*$ is calculated during execution of the LCA by integrating the value of the target curvature $Cu^*$ and reversing the sign of the obtained integral value. However, in this embodiment, the inverse integral value is calculated as follows.

The target curvature $Cu^*$ during the LCA can be represented like in Expression (17) by using the target lateral acceleration ay* and the vehicle speed v.

$$Cu^* = ay^*/v^2 \tag{17}$$

Therefore, the value obtained by integrating this target curvature $Cu^*$ from the time t0 (elapsed time t=0) to the time t1 (elapsed time t=1) can be represented like in Expression (18) by using the vehicle speed v and the target lateral speed vy*. Expression (18) is based on the assumption that the vehicle speed v can be assumed to be fixed during execution of the LCA.

$$\int_0^{t1} Cu^*(t)dt = \left[\frac{vy^*(t)}{v^2}\right]_0^{t1} \tag{18}$$

$$= \frac{vy^*(t1)}{v^2}$$

Therefore, the inverse integral value is calculated by reversing the sign of the integral value obtained by Expression (18). As described above, when the inverse integral value is calculated, the yaw angle return target curvature function $Cu_{lost}^*(t)$ for the elapsed time t from the point at which white line recognition loss is detected can be calculated based on the magnitude of the inverse integral value, the yaw angle return target time $t_{lost}$, and the change in gradient $Cu_{lost}'$.

Calculation of the yaw angle return target trajectory (yaw angle return target curvature function $Cu_{lost}^*(t)$) has been described above.

<Modified Example of Calculation of Yaw Angle Return Target Trajectory>

When white line recognition loss has occurred, it is desirable that the lateral speed, namely, the yaw angle, of the own vehicle be quickly set to zero within a range that does not cause a sense of unease to the driver. In the above-mentioned embodiment, the yaw angle return target time $t_{lost}$ is set to a fixed time. However, in this modified example, the yaw angle return target curvature $Cu_{lost}^*$ is determined based on an upper limit restriction of the yaw angle return target curvature $Cu_{lost}^*$.

Figure 10:
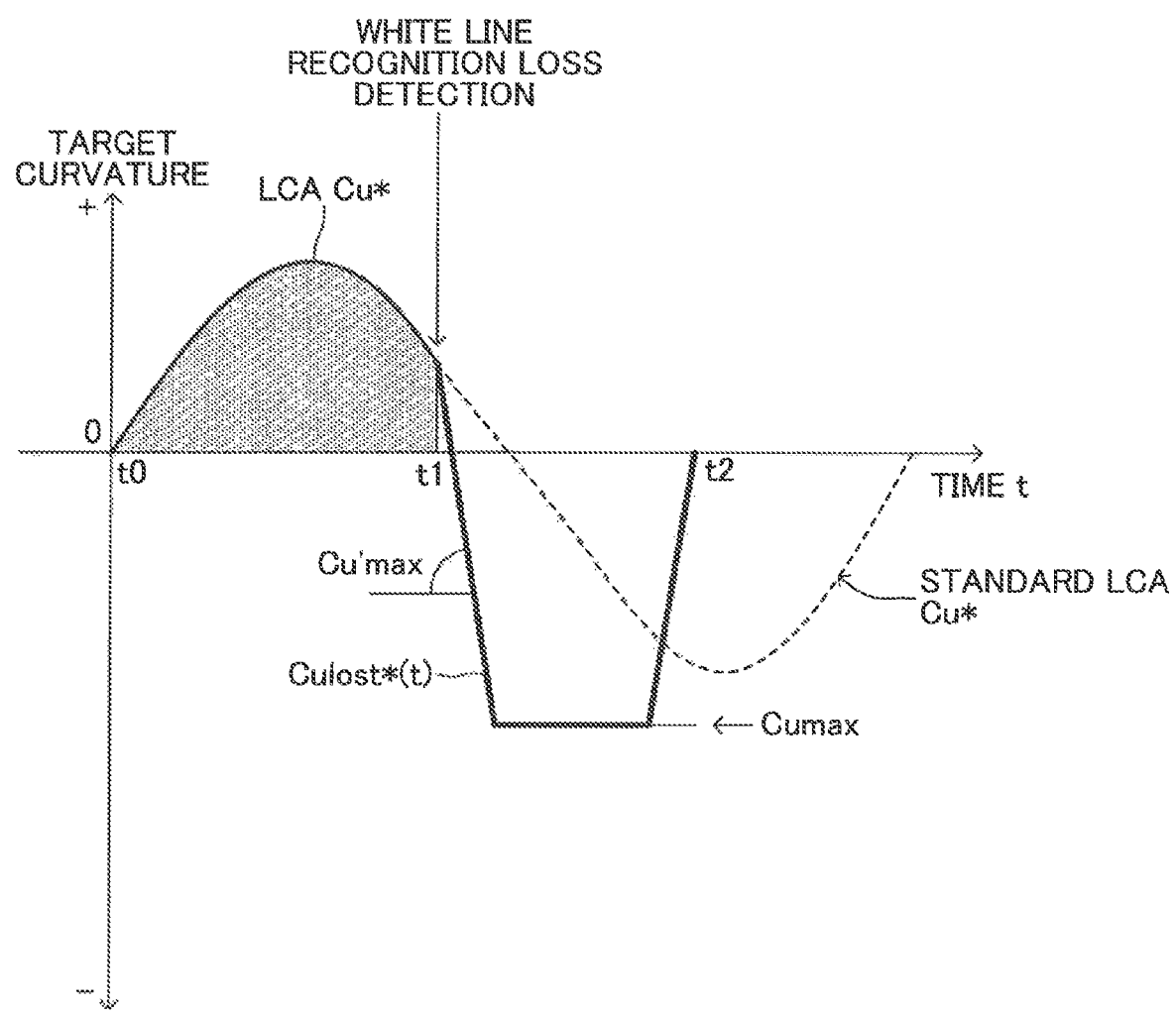
FIG. 10 is a graph for showing a graph of the target curvature in a modified example of the present invention.

In this modified example, as shown in FIG. 10, the yaw angle return target curvature $Cu_{lost}^*$ is set to a value determined based on an upper limit of the lateral acceleration of the vehicle as a final target value (maximum value $Cu_{max}$). For example, the maximum value $Cu_{max}$ is set to the maximum value of a range in which the lateral acceleration of the vehicle (lateral acceleration acting on the vehicle, which is different from the lateral acceleration in the lane width direction) that does not cause a sense of unease to the driver. For example, the maximum value $Cu_{max}$ is set to a value at which the lateral acceleration of the vehicle is 0.1 G (G being the gravitational acceleration). A lateral acceleration YG acting on the vehicle can be calculated as a value obtained by multiplying the curvature (Cu) by the square of the vehicle speed ($YG=v^2 \cdot Cu$). Therefore, based on this expression, the maximum value $Cu_{max}$ can be determined.

The change in gradient at which the yaw angle return target curvature $Cu_{lost}^*$ increases toward the maximum value $Cu_{max}$ and the change in gradient at which the yaw angle return target curvature $Cu_{lost}^*$ decreases from the maximum value $Cu_{max}$ toward zero are set to the maximum value of the range that does not cause a sense of unease to the driver (referred to as the maximum change in gradient $Cu'_{max}$). The sign of the maximum value $Cu_{max}$ of the yaw angle return target curvature $Cu_{lost}^*$ and the sign of the maximum change in gradient $Cu'_{max}$ are determined based on the sign of the inverse integral value.

The driving support ECU 10 calculates, based on the magnitude of the inverse integral value, the maximum value $Cu_{max}$ of the yaw angle return target time $Cu_{lost}^*$, and the maximum change in gradient $Cu'_{max}$, the yaw angle return target curvature function $Cu_{lost}^*(t)$ for the elapsed time t from the point when white line recognition loss is detected. As a result, a yaw angle return target curvature function $Cu_{lost}^*(t)$ is calculated for returning the integral value of the target curvature Cu* from the start of the LCA to zero within the shortest time under the control of the maximum value $Cu_{max}$ and the maximum change in gradient $Cu'_{max}$. A modified example of calculation of the yaw angle return target trajectory has been described above.

Next, in Step S20 of the routine illustrated in FIG. 5, the driving support ECU 10 performs steering control based on the yaw angle return target curvature function $Cu_{lost}^*(t)$ calculated in the previous Step S19 and the curvature Cu (referred to as the curvature Cu at loss) detected by the camera sensor 12 immediately before white line recognition loss is detected. In this case, the driving support ECU 10 resets a clock timer t (the clock timer t starts after being cleared to zero), and calculates the yaw angle return target curvature $Cu_{lost}^*$ at the current time point based on the elapsed time t from the point when white line recognition loss is detected and the yaw angle return target curvature function $Cu_{lost}^*(t)$. The driving support ECU 10 also stores, when white line recognition loss is detected, the curvature Cu detected by the camera sensor 12 immediately before that point as the curvature Cu at loss. The driving support ECU 10 calculates a target steering angle $\theta_{lost}^*$ at the current time point based on the yaw angle return target curvature $Cu_{lost}^*$ at the current time point and the curvature Cu at loss. The target steering angle $\theta_{lost}^*$ is, as shown in Expression (19), calculated by multiplying the control gain $K_{lca}1$ by a value obtained by adding the yaw angle return target curvature $Cu_{lost}^*$ at the current time point and the curvature Cu at loss (a fixed value).

$$\theta_{lost}^* = K_{lca}1 \cdot (Cu_{lost}^* + Cu) \tag{19}$$

The driving support ECU 10 transmits a steering command representing the target steering angle $\theta_{lost}^*$ to the EPS ECU 20 each time the target steering angle $\theta_{lost}^*$ is calculated. When the EPS ECU 20 receives the steering command, the EPS ECU 20 controls the drive of the steering motor 22 so that the steering angle follows the target steering angle $\theta_{lost}^*$. In this embodiment, the driving support ECU 10 calculates the target steering angle $\theta_{lost}^*$ as the target control amount, but the driving support ECU 10 may calculate a target torque for obtaining the target steering angle $\theta_{lost}^*$, and transmit a steering command representing that target torque to the EPS ECU 20.

In the following description, steering control using the target steering angle $\theta_{lost}^*$ is referred to as a "yaw angle return control". During white line recognition loss, correct lane information is not obtained from the camera sensor 12. Therefore, during the yaw angle return control, the steering angle is controlled based only on feed-forward control using the yaw angle return target curvature $Cu_{lost}^*$ and the curvature Cu at loss. More specifically, feedback control using the yaw angle $\theta y$ detected by the camera sensor 12 is not performed. During the yaw angle return control, the steering is controlled such that the yaw angle is decreased by the amount of increase due to the LCA.

The driving support ECU 10 can also store the values of the feedback control amounts (the second to fifth terms on the right-hand side of Expression (15)) calculated immediately before the point (time t1) at which white line recognition loss occurred, and during the yaw angle return control, add those stored values (fixed values) to the right-hand side of Expression (19) as a part of the feed-forward control amount.

Next, in Step S21, the driving support ECU 10 determines whether or not a yaw angle return control end condition is established. It is determined that the yaw angle return control end condition is established when, for example, the yaw angle return target curvature $Cu_{lost}^*$ has reached zero. As another example, it is determined that the yaw angle return control end condition is established when a fixed period of time has elapsed since white line recognition loss occurred. As still another example, it is determined that the yaw angle return control end condition is established when a steering wheel operation by the driver is detected (a steering torque equal to or more than a steering wheel operation determination threshold is detected by the steering torque sensor).

When it is determined that the yaw angle return control end condition is not established, the driving support ECU 10 returns the processing to Step S20. Through repeating this processing, the yaw angle of the own vehicle is quickly reduced within a range that does not cause a sense of unease to the driver, and together with that, the lateral speed is also quickly reduced.

When the yaw angle return control end condition is established by repeating this processing, the driving support ECU 10 ends the steering assist control routine. As a result, the yaw angle return control is also ended. In this case, the lateral speed of the own vehicle has been reduced to almost zero by the yaw angle return control, and thus it is difficult for the own vehicle to depart from the lane.

Figure 12:
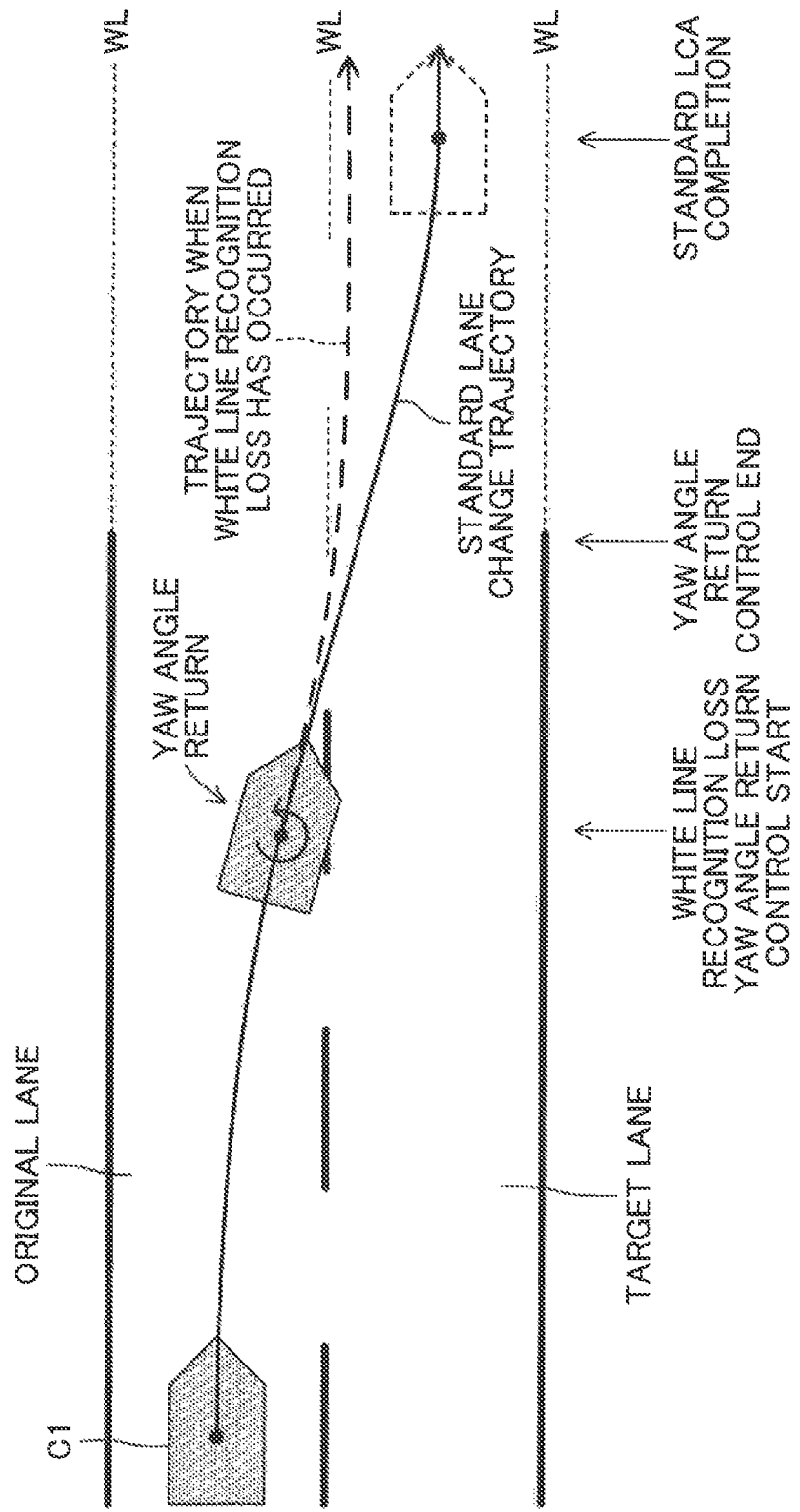
FIG. 12 is a diagram for illustrating a trajectory of the own vehicle during white line recognition loss.

FIG. 12 is a diagram for illustrating the standard lane change trajectory of the own vehicle by the LCA, and the trajectory of the own vehicle during white line recognition loss. As illustrated in FIG. 12, when the yaw angle return control is complete, the own vehicle is traveling almost parallelly to the lane.

In Step S18 of the routine illustrated in FIG. 5, when it is determined that a lateral speed in the lane change direction is not being generated, the driving support ECU 10 advances the processing to Step S22. In Step S22, the driving support ECU 10 ends the LCA. The driving support ECU 10 also transmits to the meter ECU 30 an end-of-assist notification for notifying the driver of the fact that steering assist has ended, and causes the buzzer 13 to issue a "beeping" sound. When the meter ECU 30 receives the end-of-assist notification, the meter ECU 30 switches the LCA screen 31b, which has been displayed on the display unit 31 until that point (refer to FIG. 6B), to the steering assist OFF screen 31c illustrated in FIG. 11.

When a lateral speed in the lane change direction is not being generated, the possibility of the own vehicle departing from the lane within a short period of time is low. Therefore, in such a case, in Step S22, the yaw angle return control like that of Step S19 and Step S20 is not executed.

When the processing of Step S22 is complete, the driving support ECU 10 ends the steering assist control routine.

With the steering assist device according to this embodiment described above, when white line recognition loss has occurred during the LCA, the LCA ends and the fact that steering assist has ended (the fact that steering wheel operation is required) is notified to the driver. In this case, when a lateral speed in the lane change direction is being generated, the yaw angle return target trajectory is calculated, and steering control is performed based on this yaw angle return target trajectory. As a result, the yaw angle is quickly returned to the state immediately before the start of the LCA within a range that does not cause a sense of unease to the driver, and together with that, the lateral speed of the own vehicle is quickly reduced. Therefore, sufficient time can be secured for handing over operation of the steering wheel to the driver after the LCA is ended. More specifically, the driver can be caused to start operating the steering wheel before the own vehicle departs from the lane. As a result, the possibility of the own vehicle departing from the lane can be reduced.

Figure 11:
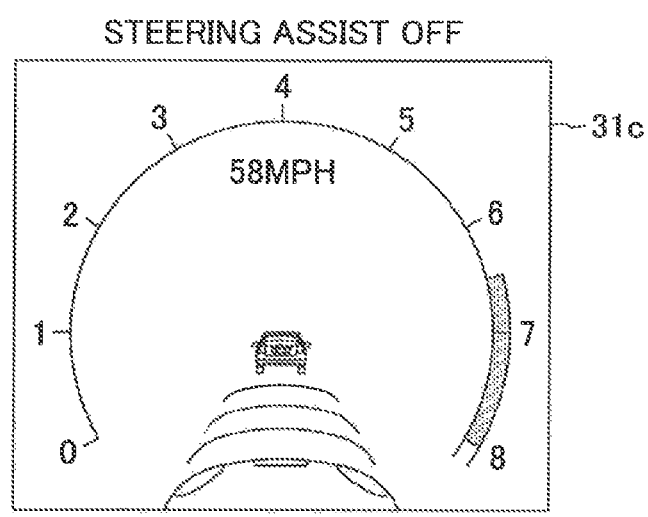
FIG. 11 is a diagram for illustrating a steering assist OFF screen of the display unit.

The notification issued when the LCA ends due to white line recognition loss is the same as the notification issued when the LTA ends due to white line recognition loss. More specifically, the steering assist OFF screen 31c illustrated in FIG. 11 is displayed. As a result, the driver is not provided with more information than is required (e.g., information on the fact that yaw angle return control is being executed is not provided), and thus, similar to when the LTA is stopped, the steering wheel operation can be smoothly started.

The yaw angle return control is executed only in cases in which a lateral speed in the lane change direction is being generated when white line recognition loss has occurred. Therefore, the yaw angle return control can be prevented from being performed more than is required.

In the above, the steering assist device according to this embodiment has been described, but the present invention is not limited to the above-mentioned embodiment, and various changes are possible within the range not departing from the object of the present invention.

For example, in the embodiment, the LCA is executed on the presumption that the steering assist control state is the LTA-ON state (state in which the LTA is executed), but such presumption is not necessarily required. The presumption that the ACC is being executed is also not required. In this embodiment, the LCA is executed on the condition that the road along which the own vehicle travels is a road for exclusive use by automobiles, but it is not always required for that condition to be included.

For example, the determination conditions of white line recognition loss are not limited to those described above in the embodiment. The determination conditions can be arbitrarily set, such as by including a state in which the white lines WL are not recognizable by at least the camera sensor 12.

What is claimed is:

1. A steering assist device, comprising:

lane recognition means for recognizing a lane to acquire lane information including a relative positional relation of an own vehicle with respect to the lane;

lane change assist control means for executing a lane change assist control, in which a steering is controlled based on the lane information so that the own vehicle changes lanes from an original lane in which the own vehicle is currently traveling to a target lane adjacent to the original lane;

recognition failure state detection means for detecting a recognition failure state, which includes a state in which the lane is not recognizable by the lane recognition means and a state in which reliability of recognizing the lane by the lane recognition means is lower than a standard;

lane change assist stop means for stopping the lane change assist control when the recognition failure state is detected during execution of the lane change assist control; and yaw angle return control means for executing a yaw angle return control, in which, when the lane change assist control has been stopped due to detection of the recognition failure state, the steering is controlled so that a yaw angle, which is an angle formed between a formation direction of the lane and a direction in which the own vehicle faces, is reduced by an amount of increase resulting from the lane change assist control.

2. The steering assist device according to claim 1, further comprising lateral speed determination means for determining, when the recognition failure state is detected, whether or not a lateral speed, which is a speed of the own vehicle in a lane width direction, is in a lane change direction and is larger than a threshold,
wherein,
the yaw angle return control means is configured to execute the yaw angle return control when it is determined that the lateral speed is in the lane change direction and is larger than the threshold.

3. The steering assist device according to claim 1, further comprising notification means for notifying, when the recognition failure state is detected, a driver that operation of a steering wheel is required.

4. The steering assist device according to claim 3, further comprising:
lane trace assist control means for executing a lane trace assist control, in which the steering is controlled based on the lane information so that a travel position of the own vehicle is kept at a fixed position in a lane width direction in the lane; and
lane keep assist stop means for stopping the lane trace assist control when the recognition failure state is detected during execution of the lane trace assist control,
wherein,
the notification means is configured to notify, by using screens having the same display content, the driver that the operation of the steering wheel is required when the lane trace assist control is stopped by the lane keep assist stop means and when the lane change assist control is stopped by the lane change assist stop means.

5. The steering assist device according to claim 1, further comprising lane trace assist control means for executing a lane trace assist control, in which the steering is controlled based on the lane information so that a travel position of the own vehicle is kept at a fixed position in a lane width direction in the lane,
wherein,
the lane change assist control means is configured to stop the lane trace assist control and start the lane change assist control when a lane change assist request is received under a state in which the lane trace assist control is being executed; and
the yaw angle return control means is configured to control the steering so that the yaw angle which has increased as a result of the lane change assist control is returned to the yaw angle immediately before a time point at which the lane change assist control starts.

6. The steering assist device according to claim 5,
wherein,
the lane change assist control means is configured to calculate at a predetermined calculation cycle a target control amount including a feed-forward control amount that uses a target curvature of a trajectory for changing the lane of the own vehicle, and to control the steering based on the calculated target control amount; and
the yaw angle return control means is configured to:
calculate an integral value of the target curvature in a period from the time point at which the lane change assist control starts to the detection of the recognition failure state;
calculate a target control amount based on the calculated integral value; and
control the steering based on the calculated target control amount.

\* \* \* \* \*